US 12,556,798 B2

(12) United States Patent
Hongu et al.

(10) Patent No.: US 12,556,798 B2
(45) Date of Patent: Feb. 17, 2026

(54) IMAGING APPARATUS, CONTROL METHOD OF THE SAME, AND STORAGE MEDIUM

(71) Applicant: CANON KABUSHIKI KAISHA, Tokyo (JP)

(72) Inventors: Hideyasu Hongu, Kanagawa (JP); Toshihiko Tomosada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 18/518,294

(22) Filed: Nov. 22, 2023

(65) Prior Publication Data
US 2024/0179393 A1  May 30, 2024

(30) Foreign Application Priority Data
Nov. 29, 2022  (JP) .................... 2022-190750

(51) Int. Cl.
| | |
|---|---|
| *H04N 23/611* | (2023.01) |
| *H04N 9/73* | (2023.01) |
| *H04N 23/67* | (2023.01) |
| *H04N 23/69* | (2023.01) |
| *H04N 23/695* | (2023.01) |

(52) U.S. Cl.
CPC ............. *H04N 23/611* (2023.01); *H04N 9/73* (2013.01); *H04N 23/67* (2023.01); *H04N 23/69* (2023.01); *H04N 23/695* (2023.01)

(58) Field of Classification Search
CPC ........ H04N 23/611; H04N 9/73; H04N 23/67; H04N 23/69; H04N 23/695; H04N 23/61; H04N 23/667; H04N 23/635; H04N 23/675; H04N 23/673; H04N 23/672; H04N 23/62; H04N 23/687; H04N 23/71; H04N 23/63; H04N 23/633; H04N 23/64; H04N 23/6812; H04N 23/60; H04N 23/631; H04N 23/632; H04N 23/6815; H04N 5/2628; G03B 13/36; G03B 13/18; G06T 7/20; G06T 2207/10016; G06T 7/246

See application file for complete search history.

(56) References Cited

U.S. PATENT DOCUMENTS

| | | | | |
|---|---|---|---|---|
| 8,994,874 | B2 * | 3/2015 | Iwasaki ................ | H04N 23/676 |
| | | | | 348/349 |
| 9,264,603 | B2 * | 2/2016 | Ogino .................. | H04N 23/611 |
| 9,906,708 | B2 * | 2/2018 | Ito .......................... | H04N 23/71 |
| 10,477,101 | B2 * | 11/2019 | Iwasaki ................ | H04N 23/672 |

(Continued)

FOREIGN PATENT DOCUMENTS

| | | |
|---|---|---|
| JP | 2003107555 A | 4/2003 |
| JP | 2010164637 A | 7/2010 |

*Primary Examiner* — Michael S Osinski
(74) *Attorney, Agent, or Firm* — Canon U.S.A., Inc. IP Division

(57) ABSTRACT

A main subject is automatically determined, and the main subject is made flexibly changeable in accordance with the intention of the user. Provided is a control method of an imaging apparatus that includes identifying a main subject in image data that is to be used for a setting of an image capturing condition, and in a case where a field angle change operation equal to or larger than a predetermined amount has been performed, performing control in such a manner as to change processing for identifying a subject, depending on whether the subject is being followed.

24 Claims, 20 Drawing Sheets

(56) References Cited

U.S. PATENT DOCUMENTS

| | | | | |
|---|---|---|---|---|
| 10,652,473 B2* | 5/2020 | Tsubusaki | H04N 23/673 |
| 10,827,127 B2* | 11/2020 | Tsubusaki | G06V 40/173 |
| 10,848,680 B2* | 11/2020 | Tsubusaki | H04N 23/69 |
| 11,553,128 B2* | 1/2023 | Uekusa | H04N 23/667 |
| 11,570,353 B2* | 1/2023 | Wada | G03B 13/36 |
| 11,765,455 B2* | 9/2023 | Hongu | G03B 13/36 348/345 |
| 11,792,351 B2* | 10/2023 | Yuan | H04N 23/67 348/239 |
| 11,956,530 B2* | 4/2024 | Shin | H04N 23/61 |
| 12,015,846 B2* | 6/2024 | Sasaki | H04N 23/673 |
| 12,445,714 B2* | 10/2025 | Konno | G06V 10/945 |
| 2005/0168620 A1* | 8/2005 | Shiraishi | H04N 23/633 348/E5.045 |
| 2007/0253603 A1* | 11/2007 | Kimura | G06V 10/98 382/115 |
| 2009/0073287 A1* | 3/2009 | Shimizu | H04N 23/73 348/E9.053 |
| 2010/0149369 A1* | 6/2010 | Yasuda | H04N 23/611 348/222.1 |
| 2010/0150450 A1* | 6/2010 | Tsuji | H04N 23/611 382/195 |
| 2011/0115945 A1* | 5/2011 | Takano | G03B 17/20 348/E5.031 |
| 2012/0300083 A1* | 11/2012 | Funamoto | H04N 25/704 348/169 |
| 2012/0301125 A1* | 11/2012 | Ashida | G03B 13/36 396/95 |
| 2013/0265482 A1* | 10/2013 | Funamoto | H04N 23/70 348/349 |
| 2013/0314579 A1* | 11/2013 | Sasaki | H04N 23/673 348/333.02 |
| 2015/0227023 A1* | 8/2015 | Hamano | H04N 23/635 348/169 |
| 2016/0044245 A1* | 2/2016 | Tsubaki | H04N 23/683 348/208.11 |
| 2016/0073006 A1* | 3/2016 | Funamoto | G06V 20/52 348/345 |
| 2016/0286112 A1* | 9/2016 | Uemura | H04N 23/71 |
| 2017/0163894 A1* | 6/2017 | Wakamatsu | H04N 23/6812 |
| 2017/0214855 A1* | 7/2017 | Miyazawa | H04N 23/682 |
| 2018/0027172 A1* | 1/2018 | Akaguma | G03B 3/10 348/345 |
| 2018/0241946 A1* | 8/2018 | Shintani | H04N 23/681 |
| 2019/0020826 A1* | 1/2019 | Takehara | H04N 25/674 |
| 2019/0116311 A1* | 4/2019 | Sato | H04N 23/69 |
| 2019/0208131 A1* | 7/2019 | Du | H04N 23/675 |
| 2020/0336671 A1* | 10/2020 | Lee | H04N 23/695 |
| 2021/0075972 A1* | 3/2021 | Fukugawa | G06V 10/764 |
| 2021/0158537 A1* | 5/2021 | Funamoto | G06T 7/20 |
| 2021/0337113 A1* | 10/2021 | Kokubun | G06T 7/74 |
| 2021/0366131 A1* | 11/2021 | Matsuda | H04N 23/60 |
| 2022/0030157 A1* | 1/2022 | Waitz | G03B 17/18 |
| 2022/0321782 A1* | 10/2022 | Hongu | H04N 23/675 |
| 2022/0329740 A1* | 10/2022 | Sakato | G06T 7/73 |
| 2022/0353427 A1* | 11/2022 | Kawanishi | H04N 23/672 |
| 2022/0417446 A1* | 12/2022 | Lee | G11B 27/28 |
| 2023/0008588 A1* | 1/2023 | Iguchi | H04N 23/80 |
| 2023/0114785 A1* | 4/2023 | Stepanova | H04N 13/128 348/47 |
| 2023/0128043 A1* | 4/2023 | Goto | H04N 23/61 348/345 |
| 2023/0179869 A1* | 6/2023 | Mimura | H04N 23/71 348/362 |
| 2023/0300460 A1* | 9/2023 | Saito | H04N 23/611 |
| 2023/0370562 A1* | 11/2023 | Schmitt | H04N 23/635 |
| 2023/0370713 A1* | 11/2023 | Zhou | H04N 23/635 |
| 2025/0203194 A1* | 6/2025 | Ikeda | G06T 7/11 |
| 2025/0280201 A1* | 9/2025 | Jeon | H04N 23/63 |

* cited by examiner

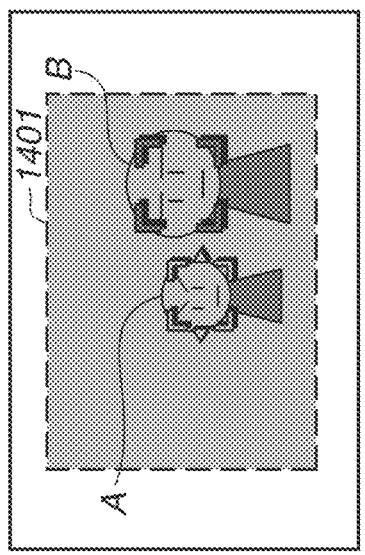
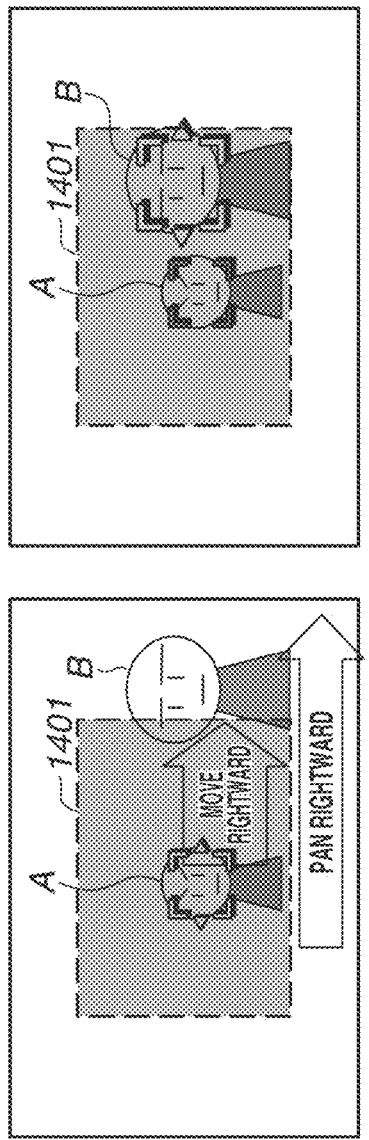
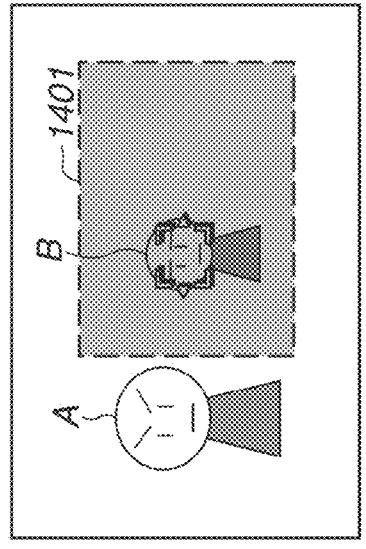
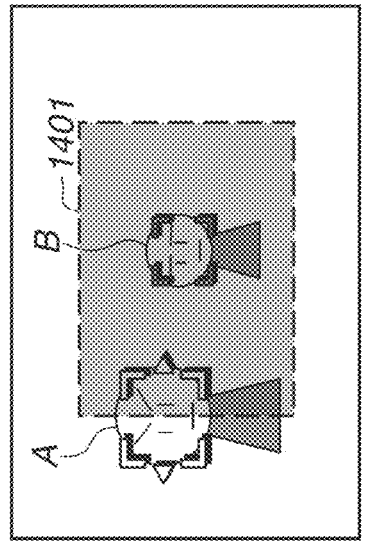
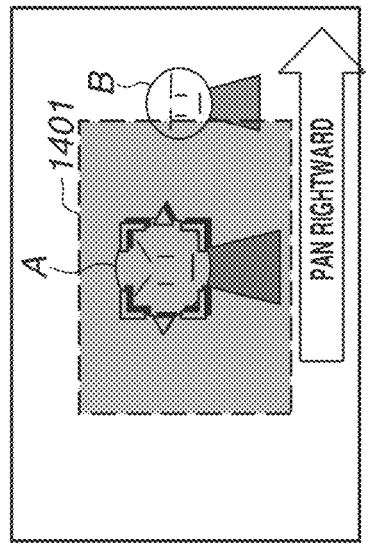

BEFORE PANNING

SUBJECT CHANGE DURING PANNING

SUBJECT FOLLOWING DURING PANNING

IMAGE CAPTURING MAGNIFICATION IS LARGE

IMAGE CAPTURING MAGNIFICATION IS SMALL

SUBJECT FOLLOWING DETERMINATION RANGE AND DETECTION/TRACKING RANGE

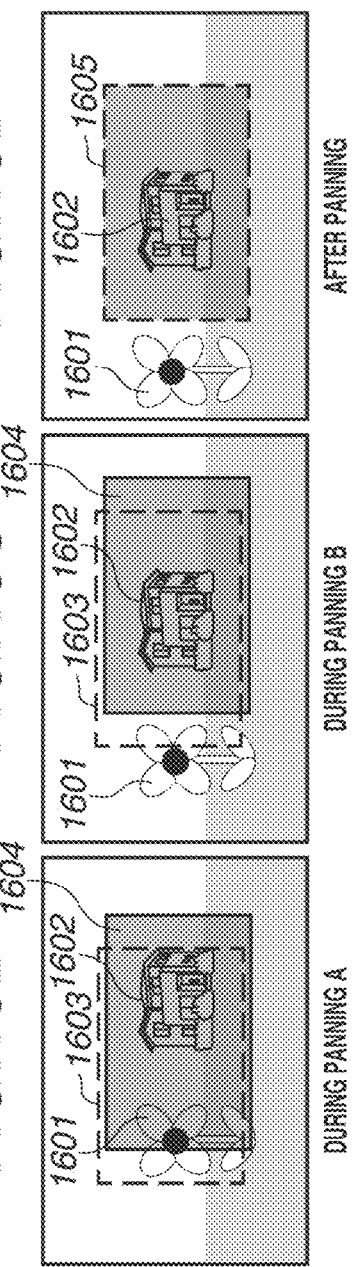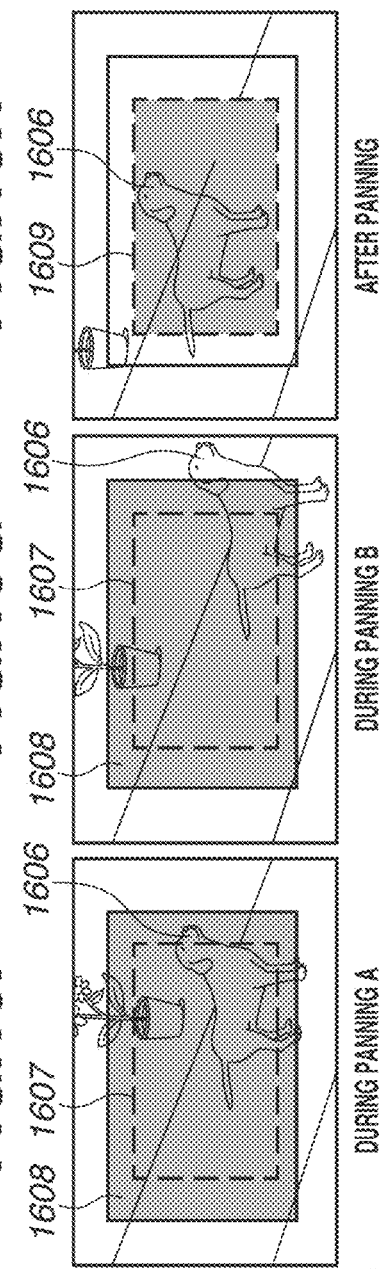

BEFORE PAN/TILT/ZOOM FOR SUBJECT CHANGE | DURING PAN/TILT/ZOOM A | DURING PAN/TILT/ZOOM B | AFTER PAN/TILT/ZOOM

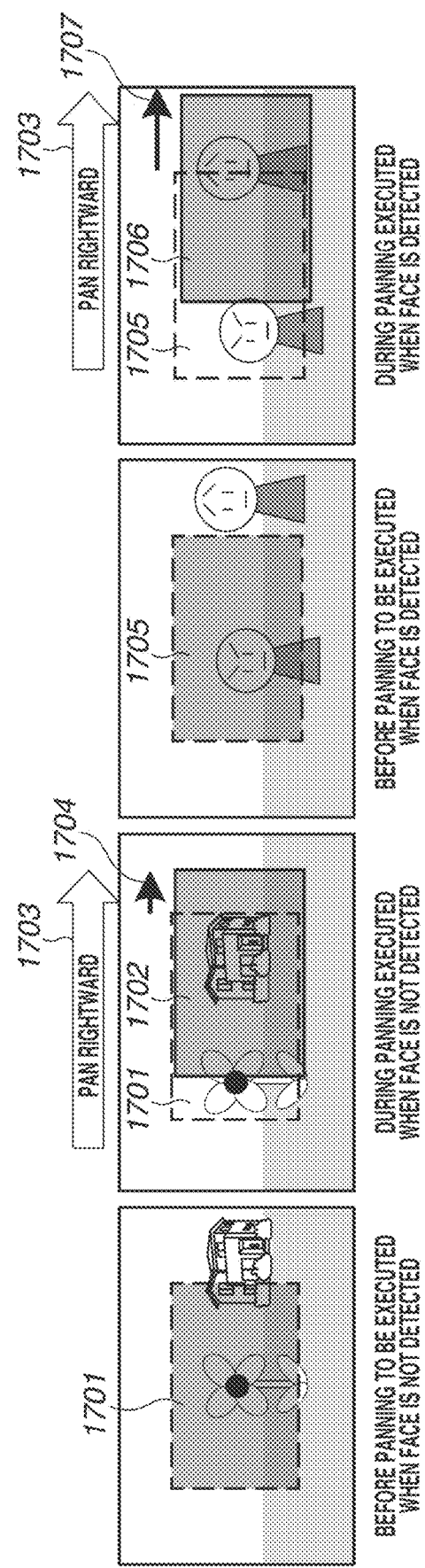

IMAGING APPARATUS, CONTROL METHOD OF THE SAME, AND STORAGE MEDIUM

BACKGROUND OF THE DISCLOSURE

Field of the Disclosure

The present disclosure relates to an imaging apparatus having a subject tracking function, a control method of the imaging apparatus, and a storage medium.

Description of the Related Art

There has been conventionally proposed a camera that automatically identifies a main subject by detecting a face of a person, an animal, or a vehicle from a captured image, and tracking a subject based on color information and pattern information. Japanese Patent Application Laid-Open No. 2010-164637 discusses a technique of causing an autofocus (AF) frame to follow a main subject and putting a focus on the main subject by updating the position of the AF frame in accordance with the position of a face of a detected person or the position of a specific subject (object) being tracked, using a known face detection technique and a known tracking technique. In addition, Japanese Patent Application Laid-Open No. 2003-107555 discusses a technique of a camera that obtains image data from an image sensor. The technique automatically detects a face serving as a main subject, from the obtained image data using a method such as shape analysis, and performs exposure control in such a manner that the detected face is subjected to appropriate exposure.

Nevertheless, in a case where a panning operation, a tilting operation, and a zoom operation are performed, the technique discussed in Japanese Patent Application Laid-Open No. 2010-164637 stops the following executed by the AF frame. This has caused such an issue that, in a case where a user performs a panning operation, a tilting operation, and a zoom operation in accordance with the motion of a subject, and continues to bring the subject into a field angle, because an AF frame is not following the subject, a focus is put on the background. Also in a case where a panning operation, a tilting operation, and a zoom operation for changing a main subject by a field angle change are performed, an AF frame has been fixed in some cases. In this case, there has been such an issue that, even if a different person or a specific subject targeted by the user exists within the field angle, a focus is put not on the person or the specific subject but on an unintended subject such as the background.

Similarly to the above-described focus control, in a case where a panning operation, a tilting operation, and a zoom operation are performed, because a main subject cannot be identified flexibly, it has been difficult to execute exposure control and white balance control suitable for a subject intended by the user.

SUMMARY OF THE DISCLOSURE

The present disclosure has been made in consideration of the above situation, and provides an imaging apparatus, a control method of an imaging apparatus, and a storage medium that can flexibly change a main subject in accordance with the intention of the user.

According to the present disclosure, provided is an imaging apparatus includes an imaging unit configured to generate image data by capturing an image of a subject, a setting unit configured to set an image capturing condition, an identification unit configured to identify a main subject in the image data that is to be used for a setting of the image capturing condition that is to be made by the setting unit, and a control unit configured to, in a case where a field angle change operation equal to or larger than a predetermined amount has been performed, perform control in such a manner as to change processing for identifying a subject, depending on whether the subject is being followed.

Further features of the present disclosure will become apparent from the following description of exemplary embodiments with reference to the attached drawings.

BRIEF DESCRIPTION OF THE DRAWINGS

FIGS. 14A to 14F are conceptual diagrams illustrating an effect to be obtained by face AF control change.

FIGS. 16A to 16L are conceptual diagrams illustrating an effect to be obtained by whole area AF control change.

FIGS. 17A to 17D are conceptual diagrams illustrating offset amounts to be obtained when a face is detected and when a face is not detected (whole area AF).

DESCRIPTION OF THE EMBODIMENTS

Hereinafter, exemplary embodiments of the present disclosure will be described in detail based on the accompanying drawings.

<Configuration of Camera Platform Camera System>

Figure 1:
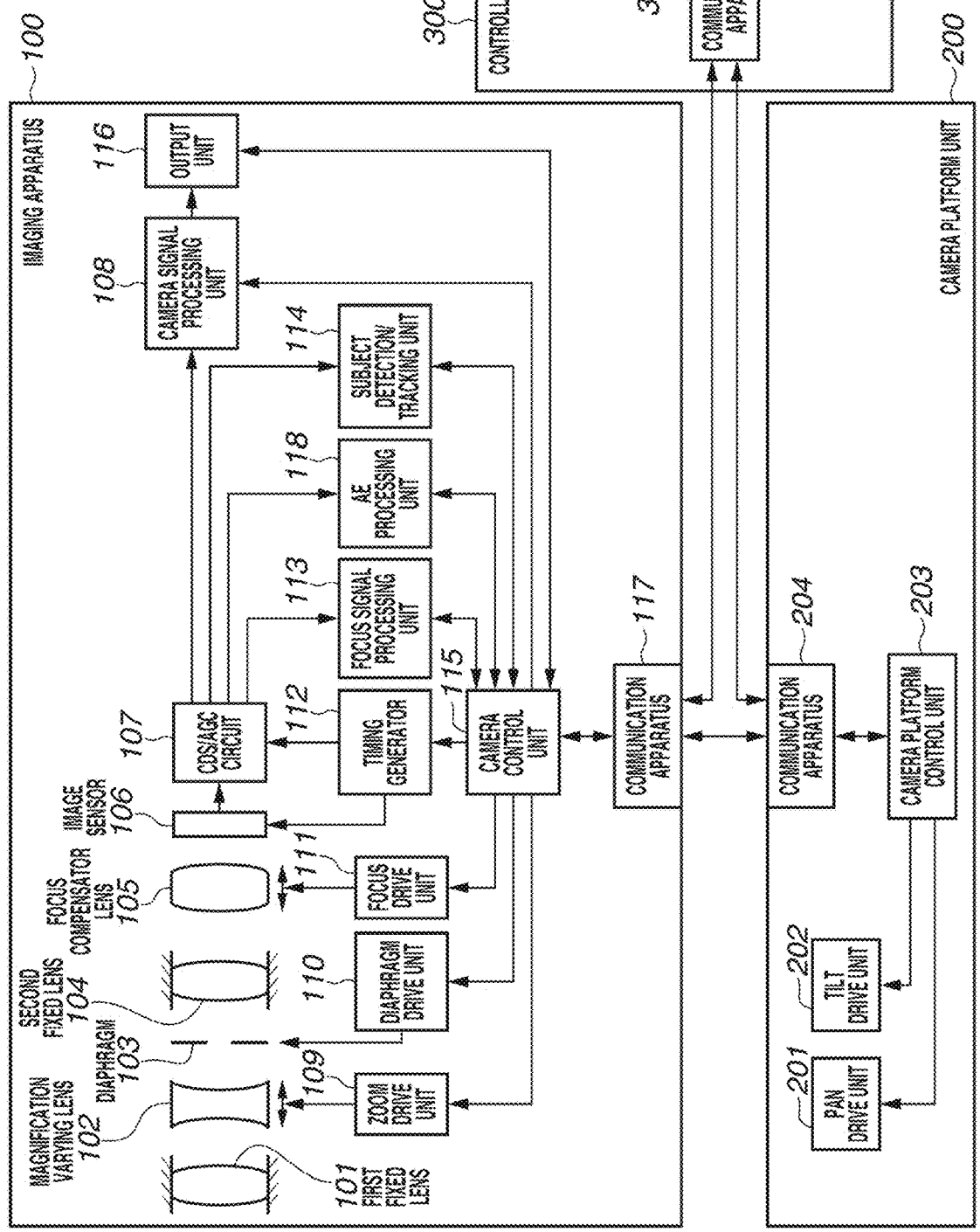
FIG. 1 is a block diagram illustrating a schematic configuration of a platform camera system according to a first exemplary embodiment camera.

FIG. 1 is a block diagram illustrating a schematic configuration of a camera platform camera system that includes pan, tilt, and zoom functions, according to a first exemplary embodiment of the present disclosure. As illustrated in FIG. 1, the camera platform camera system according to the present exemplary embodiment includes a camera unit 100, a camera platform unit 200, and a controller 300. Then, a camera control unit 115 that comprehensively controls the operations of the entire camera unit 100, and a camera platform control unit 203 that comprehensively controls the operations of the entire camera platform unit 200 perform data communication via a communication apparatus 117 and a communication apparatus 204. In addition, a controller control unit 303 that comprehensively controls the operations of the entire controller 300 performs data communication with the camera control unit 115 and the camera platform control unit 203 via a communication apparatus 305. In the present exemplary embodiment, the camera control unit 115, the camera platform control unit 203, and the controller control unit 303 each include processors such as a central processing unit (CPU) and a micro processing unit (MPU), and a storage unit such as a memory. In addition, the camera control unit 115, the camera platform control unit 203, and the controller control unit 303 may each include an arithmetic circuit, and the arithmetic circuit may execute a part of calculation functions to be executed by a processor. In the present exemplary embodiment, the description will be given assuming that the camera unit 100, the camera platform unit 200, and the controller 300 are independent of each other, but the present disclosure can also be applied to a camera platform camera system in which all of these are integrated.

<Configuration of Camera Unit 100>

First of all, a configuration of the camera unit 100 will be described. In the camera unit 100, an image capturing optical system for forming an image based on light from a subject includes a first fixed lens 101, a magnification varying lens 102, a diaphragm 103, a second fixed lens 104, and a focus compensator lens (hereinafter, focus lens) 105. The magnification varying lens (hereinafter, zoom lens) 102 is a lens that performs a magnification varying (hereinafter, zoom) operation by moving in an optical axis direction. By being driven by a zoom drive unit 109, the zoom lens 102 is used for zoom control. In addition, the focus lens 105 includes a function of correcting the movement of a focal plane that is performed in accordance with zoom, and a focusing function. By being driven by a focus drive unit 111, the focus lens 105 is used for focusing. The diaphragm 103 is driven by a diaphragm drive unit 110, and controls an amount of light entering an image sensor 106 to be described below.

The zoom drive unit 109, the diaphragm drive unit 110, and the focus drive unit 111 are controlled by the camera control unit 115, whereby an aperture diameter of the diaphragm 103 and positions of the zoom lens 102 and the focus lens 105 are controlled. It is possible to perform an operation such as a focus operation or a zoom operation by the user operating a focus dial (not illustrated) or a zoom lever (not illustrated) that is included in an operation unit 302 included in the controller 300. In a case where the operation is performed, the camera control unit 115 controls the diaphragm drive unit 110, the zoom drive unit 109, and the focus drive unit 111 in accordance with a control command and control information that have been received from the controller control unit 303 to be described below, via the communication apparatus 305 and the communication apparatus 117. In addition, the camera control unit 115 also transmits camera information to the controller control unit 303. The zoom drive unit 109, the diaphragm drive unit 110, and the focus drive unit 111 each include an actuator such as a stepping motor, a direct-current (DC) motor, a vibration motor, or a voice coil motor.

The image sensor 106 is a member serving as an image sensor. Light beams that have passed through the above-described image capturing optical system form an image onto a light receiving surface of the image sensor 106. Then, a formed subject image is photoelectrically converted by photodiodes (photoelectric conversion units) of the image sensor 106 into charges in accordance with an incident light amount, and the charges are accumulated. The charges accumulated in the photodiodes are sequentially read out from the image sensor 106 as voltage signals corresponding to the charges, based on a drive pulse supplied from a timing generator 112, in accordance with a command from the camera control unit 115.

Aside from a normal image capturing signal, the image sensor 106 according to the present exemplary embodiment can output a pair of focus signals that can be used for commonly-known imaging plane phase difference method focus detection.

The image capturing signal and the focus signals read out from the image sensor 106 are input to a correlated double sampling/auto gain control (CDS/AGC) circuit 107, and correlated double sampling for removing reset noise, gain adjustment, and signal digitalization are performed. The CDS/AGC circuit 107 outputs the processed image capturing signal to a camera signal processing unit 108, a subject detection/tracking unit 114, and an autoexposure (AE) processing unit 118, and outputs the processed focus signals to a focus signal processing unit 113.

The camera signal processing unit 108 performs various types of image processing on the image capturing signal output from the CDS/AGC circuit 107, and generates image data. The image processing includes image quality control processing for controlling white balance, color, and brightness, resize processing of changing a size into a display size, and processing of generating an image file by compressing and encoding image data having been subjected to the image quality control processing, into a Joint Photographic Experts Group (JPEG) format. An output unit 116 outputs image data generated by the camera signal processing unit 108, to the controller 300 via the communication apparatus 117 and the communication apparatus 305, and displays a video on a display unit 301 included in the controller 300, or records a video into a storage unit 304. In the present exemplary embodiment, the description will be given assuming that the controller 300 performs the display and recording of videos via communication. Nevertheless, the output unit 116 may directly output image data to a display device (not illustrated) such as a television monitor connected on the outside, or a recording device (not illustrated) such as a recorder, via a High-Definition Multimedia Interface (HDMI)(registered trademark) cable (not illustrated) or a serial digital interface (SDI) cable (not illustrated).

The focus signal processing unit 113 detects a focus state by performing correlation calculation based on the pair of focus signals output from the CDS/AGC circuit 107. Here, the focus signal processing unit 113 calculates a correlation amount, a defocus amount, and reliability information (two-image coincidence degree, two-image steepness degree, contrast information, saturation information, scratch information, etc.). Then, the focus signal processing unit 113 outputs the calculated defocus amount and reliability information to the camera control unit 115. In addition, the camera control unit 115 notifies the focus signal processing unit 113 of the change of the settings for calculating these, based on the acquired defocus amount and reliability information. The focus signal processing unit 113 may generate an AF evaluation value representing a video sharpness degree (contrast state), by extracting high-frequency components from the focus signals. Because the generated AF evaluation value varies depending on the focus state (in-focus degree) of the image capturing optical system, the generated AF evaluation value accordingly becomes a signal representing the focus state of the image capturing optical system.

The AE processing unit 118 performs predetermined calculation processing using the image capturing signal output from the CDS/AGC circuit 107, and performs AE processing by controlling a diaphragm and a shutter of the image sensor 106 based on the obtained calculation result.

The subject detection/tracking unit 114 performs known face detection processing on the image capturing signal output from the CDS/AGC circuit 107 or image data having been subjected to various types of image processing, and detects a face region of a person within an image capturing screen. In other words, the subject detection/tracking unit 114 detects a predefined subject (in this example, face) from image data. Even in a case where it becomes unable to detect a face, it is also possible to continuously follow a face by performing tracking processing for a predetermined time based on color information and information regarding design and patterns that are obtained immediately before face detection becomes inexecutable. It is also possible to perform tracking processing based on color information and design/pattern information of a specific subject existing in an area designated by the user by a touch operation. Alliteratively, irrespective of the designation made by the user, a camera may automatically start tracking of a subject existing within a specific area in an image capturing screen at a specific timing. The detection/tracking result is transmitted to the camera control unit 115. As face detection processing, for example, there is a method of extracting a skin color region from a gradation color of each pixel represented by image data, and detecting a face based on a degree of matching with a face outline plate prepared in advance. Aside from this, there is a method of performing face detection by extracting feature points of a face such as eyes, a nose, and a mouth using a known pattern recognition technique. The present disclosure is not limited by the method of face detection processing, and any method may be used. In addition, a subject to be detected is not limited to a face, and a subject may be a subject other than a face of a person, such as a pupil or a body trunk of a person, a face/pupil of an animal, or a vehicle, for example.

In the present exemplary embodiment, based on a detection/tracking result obtained by the subject detection/tracking unit 114, the camera control unit 115 to be described below transmits information to the focus signal processing unit 113 in such a manner as to set an autofocus (AF) frame at a position where the AF frame includes a face region of a person or a specific subject region within an image capturing screen. In the present exemplary embodiment, in a case where a face is detected, an AF frame is set based on the position/size of a face region of a person serving as a main subject, and in a case where a face is not detected, an AF frame is set based on the position/size of a specific subject region being tracked.

The camera control unit 115 governs the control of operations by exchanging information with the components included in the camera unit 100. Together with this, based on a focus detection result (information such as a defocus amount and an AF evaluation value) obtained from an AF frame set in a face region of a person serving as a main subject, or a specific subject region, the camera control unit 115 controls the focus drive unit 111 to move the focus lens 105. The camera control unit 115 thereby also performs AF control for performing focusing. Because the AF control is a known technique, the details of control will be omitted.

The camera control unit 115 performs not only the processing within the camera unit 100 but also processing corresponding to input from the operation unit 302 of the controller 300 operated by the user. For example, the camera control unit 115 controls various functions corresponding to user operations such as power ON/OFF, switching of AF/manual focus (MF) control, the change of an image capturing setting and a display setting, and recording.

<Configuration of Camera Platform Unit 200>

Next, a configuration of the camera platform unit 200 will be described. The camera platform unit 200 is assumed to have a structure of holding the camera unit 100 in such a manner that the entire camera unit 100 is rotatable in a panning direction and a tilting direction. In addition, the camera platform unit 200 includes a pan drive unit 201 for rotating the camera unit 100 in the panning direction, a tilt drive unit 202 for rotating the camera unit 100 in the tilting direction, the camera platform control unit 203, and the communication apparatus 204. The pan drive unit 201 and the tilt drive unit 202 each include an actuator such as a stepping motor, a DC motor, a vibration motor, or a voice coil motor.

The camera platform control unit 203 governs the control of the entire camera platform unit 200. Together with this, the camera platform control unit 203 controls the pan drive unit 201 or the tilt drive unit 202 in accordance with an operation instruction from the controller 300, and notifies the camera unit 100 and the controller 300 of control information via the communication apparatus 204.

<Configuration of Controller 300>

Next, a configuration of the controller 300 will be described. The controller 300 is a controller for operating the camera platform unit 200 from the outside for changing an image capturing setting of the camera unit 100, a zoom operation for field angle adjustment, a diaphragm operation for exposure adjustment, or a field angle change. The controller 300 includes the display unit 301, the operation unit 302, the controller control unit 303, the storage unit 304, and the communication apparatus 305.

The display unit 301 is a display device such as a liquid crystal display (LCD) or an organic electroluminescence (EL) display. The display unit 301 receives image data output by the output unit 116 of the camera unit 100, via the communication apparatus 305, and displays the received image. The operation unit 302 includes members (not illustrated) such as a dial for a focus operation, a lever for a zoom operation, a joystick for a panning/tilting operation (hereinafter, will be described as a PT operation), and a button and a switch for mode switching. Because the PT operation can change a field angle, the PT operation will also be referred to as a field angle change operation together with a zoom operation. The operation unit 302 is not limited to a physical operation member. Application software for control may be displayed on the display unit 301, and buttons and switches arranged on a screen may be made operable by a touch operation.

The controller control unit 303 governs the control of the entire controller 300. Together with this, the controller control unit 303 transmits an operation instruction to the camera unit 100 and the camera platform unit 200 via the communication apparatus 305, and receives camera information and image data from the camera unit 100 and PT operation information from the camera platform unit 200.

The storage unit 304 includes a storage medium such as an optical disk, a semiconductor memory, or a magnetic tape, and records image data received via the communication apparatus 305. Nevertheless, the configuration is not limited to this configuration. Recording may be performed on a recording medium connected on the outside of the controller 300.

<AF Frame Automatic Following Processing According to First Exemplary Embodiment>

Figure 2:
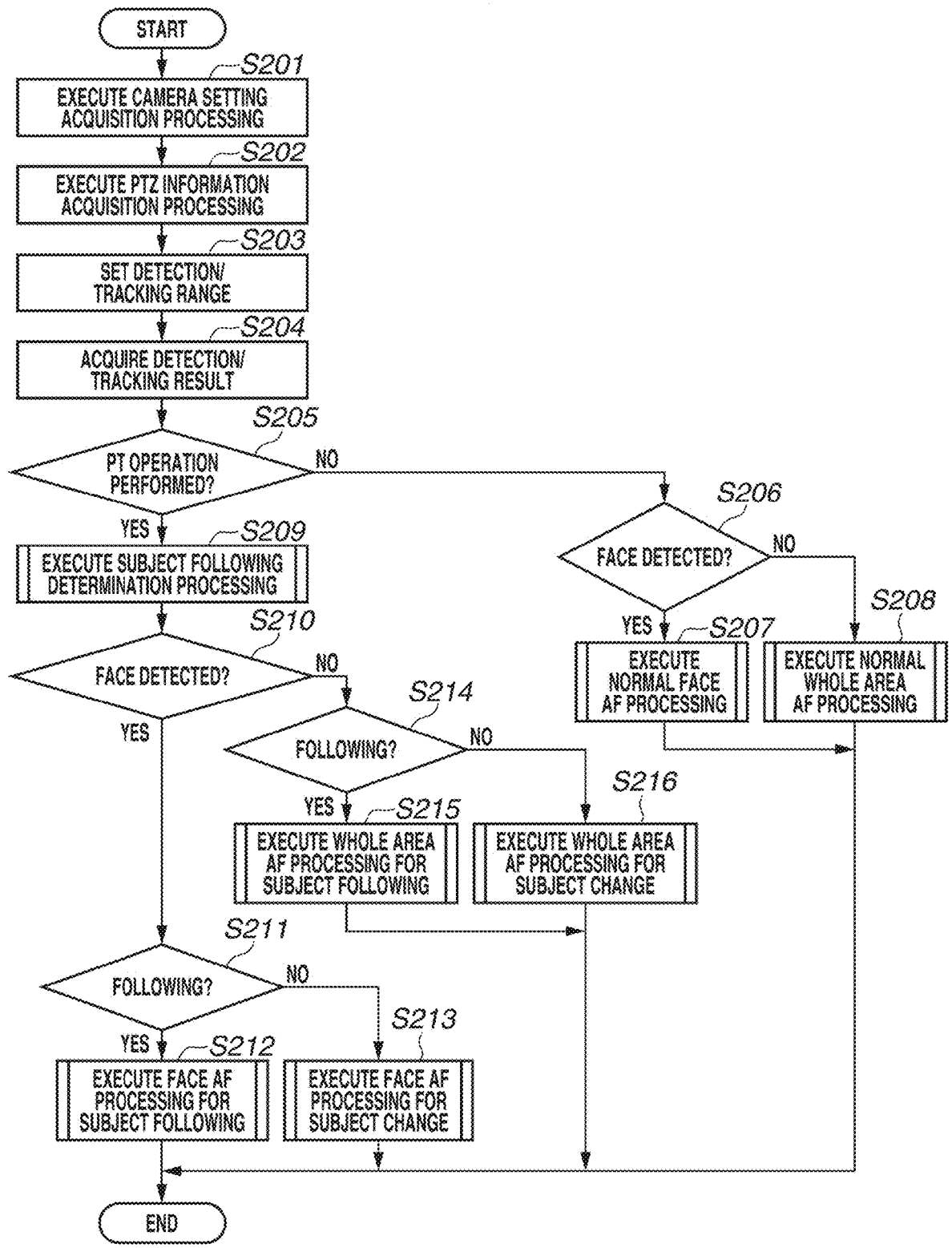
FIG. 2 is a flowchart illustrating autofocus (AF) processing according to an exemplary embodiment.

Next, AF frame automatic following processing in the camera platform camera system, which is a characteristic of the present exemplary embodiment, will be described with reference to FIGS. 2 to 10. FIG. 2 illustrates a flow of processing according to the present exemplary embodiment. In the processing, it is determined whether a main subject is being followed, based on a detection/tracking result and PT operation information, a main subject is selected in accordance with a determination result, an AF frame is caused to follow the main subject, and focusing control is performed. The processing is executed in accordance with a computer program stored in the camera control unit 115. A series of processes according to the present exemplary embodiment are assumed to be executed by a system in synchronization with an image capturing cycle, but the configuration need not be limited to this.

In step S201, the camera control unit 115 acquires various camera settings such as an image capturing setting and a display setting, and furthermore, the state of an AF/MF mode that have been changed in accordance with the input from the operation unit 302 of the controller 300 operated by the user. In step S202 and subsequent steps, the camera control unit 115 performs processing corresponding to the acquired camera settings.

In step S202, the camera control unit 115 performs processing of acquiring information regarding a panning (Pan) operation, a tilting (Tilt) operation, and a zoom (Zoom) operation from the operation unit 302 of the controller 300 operated by the user. In the present exemplary embodiment, the camera control unit 115 acquires information such as information indicating whether a PT operation and a zoom operation are being performed, change amounts and speeds in a pan direction and a tilt direction of image capturing (may be an angle change amount per unit time), a zoom direction and a speed (may be a field angle change amount per unit time), and a magnification. Nevertheless, the camera control unit 115 may acquire operation information transmitted from the controller 300, or may detect drive states of the zoom drive unit 109 of the camera unit 100 and the pan drive unit 201 and the tilt drive unit 202 of the camera platform unit 200, and acquire the drive information.

In step S203, the camera control unit 115 sets a region corresponding to a detection/tracking range indicating a range in an image capturing screen within which a face region of a person or a specific subject region that is to be detected and tracked by the subject detection/tracking unit 114 is to be detected and tracked. Because general moving image capturing is often performed with a main subject existing near the screen center, in the present exemplary embodiment, the description will be given assuming that a range corresponding to about 60% of an image capturing screen in longitudinal and traverse detections is set as a basic detection/tracking range.

In step S204, the camera control unit 115 acquires a detection result and a tracking result from the subject detection/tracking unit 114. The acquired results include the number of detected faces, and in a case where a plurality of faces is detected, ID information for making each detection result and tracking result identifiable, information for making a face serving as a main subject (main face), identifiable, face information such as the position and the size of each face, and color information and pattern information for tracking processing. The acquired results are used in the processing in step S205 and subsequent steps, which will described in detail below. Aside from the above-described information, the acquired results may include reliability information of face detection, and accompanying information that can be determined from the detection result, such as face direction information (90 degrees in a leftward direction, 45 degrees in the leftward direction, full-faced, 45 degrees in a rightward direction, 90 degrees in the rightward direction, indeterminate (backward-looking), etc.) and orientation information (rotational angle of face), for example.

Figure 11A:
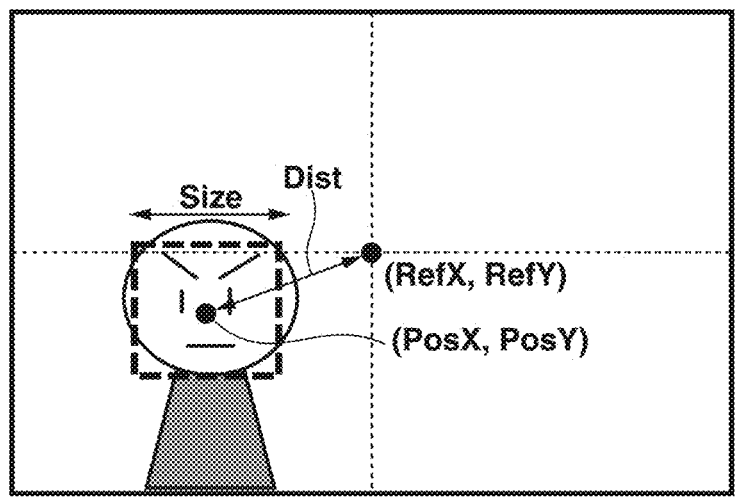
FIGS. 11A and 11B are schematic diagrams illustrating face information obtained in face detection.

FIG. 11A is a diagram illustrating an example of face information of a person existing in a captured image. In addition to central coordinates (PosX, PosY) of a face, the face information includes a distance (Dist) from reference coordinates (RefX, RefY) of a captured image to the central coordinates (PosX, PosY) of the detected face. The face information also includes a face size (Size) indicating a length of one side that is obtainable in a case where the shape of the face is square, and a reliability value indicating a probability of the detected face being a face of a person. These pieces of face information are acquired from a captured image using a known face detection technique. For example, utilizing the fact that a large proportion of the face has a skin color, the face size can be set to a size with which a proportion of a skin color region included in a square with a predetermined size becomes a predetermined value. Utilizing the fact that a pupil color is black, the reliability is determined based on whether two eyes are included, a distance between the two eyes, and whether a nose exists between the two eyes. The reliability is represented in ten levels from 1 to 10, where 1 indicates the highest probability of the detected face being a face of a person.

The camera control unit 115 includes a buffer (not illustrated) for temporarily storing a subject detection/tracking result imported from the subject detection/tracking unit 114. Then, a storage region for storing at least the current result and the last result of subject detection/tracking results imported from the subject detection/tracking unit 114 is assumed to be ensured. The camera control unit 115 performs matching with a face detected from the last captured image that is stored in the buffer, for each face detected from the current captured image, based on the position and the size of the detected face. Based on the matching result, the camera control unit 115 performs association between faces in the last and current captured images that are considered to be detected as the face of the same person, and detects a face corresponding to the face detected most recently. With this configuration, it is possible to identify a face that had served as a main face in the last captured image, among currently-detected faces.

Next, in step S205, the camera control unit 115 determines whether a PT operation has been performed, based on the operation information acquired in step S202. In a case where it is determined that a PT operation has been performed (YES in step S205), the processing proceeds to step S209. In a case where it is determined that a PT operation has not been performed (NO in step S205), the processing proceeds to step S206. The processing in steps S206 to S208 indicates processing to be executed in a state in which a PT operation has not been performed (i.e., state in which the camera unit 100 is fixed), and the processing in steps S209 to S216 indicates processing to be executed in a state in which a PT operation has been performed. In the present exemplary embodiment, the camera control unit 115 determines whether a PT operation has been performed, based on operation information transmitted from the controller 300. Nevertheless, the camera control unit 115 may detect drive states of the pan drive unit 201 and the tilt drive unit 202 of the camera platform unit 200, and determine whether a PT operation has been performed.

Next, in step S206, the camera control unit 115 determines whether a face region of a person has been detected/is being tracked, based on the detection/tracking result acquired in step S204. Then, in a case where a face region of a person has been detected/is being tracked (YES in step S206), the processing proceeds to step S207. In a case where a face region of a person has not been detected/is not being tracked (NO in step S206), the processing proceeds to step S208. In the present exemplary embodiment, in a case where a face region of a person has been detected/is being tracked, a state in which an AF frame is following the face region of the person is explicitly presented to the user by displaying a rectangular frame indicating the face region, on the display unit 301 of the controller 300. Then, AF control is switched between AF control to be executed in a case where a face region of a person has been detected/is being tracked, and AF control to be executed in other cases. Because the AF control to be executed in a case where a face region of a person has been detected/is being tracked causes an AF frame to follow the face region of the person, in the following description, the AF control will be referred to as "face AF control". In the present exemplary embodiment, AF control to be executed in a case where a face region of a person has not been detected/is not being tracked captures a subject existing near the almost center of an image capturing screen, as a main subject, and executes tracking within a range corresponding to about 60% of an image capturing field angle even in a screen peripheral part. In the following description, the AF control will be referred to as "whole area AF control".

Face AF control and whole area AF control, which serve as basic control in the present exemplary embodiment, will be described with reference to FIGS. 3 and 4.

Figure 3:
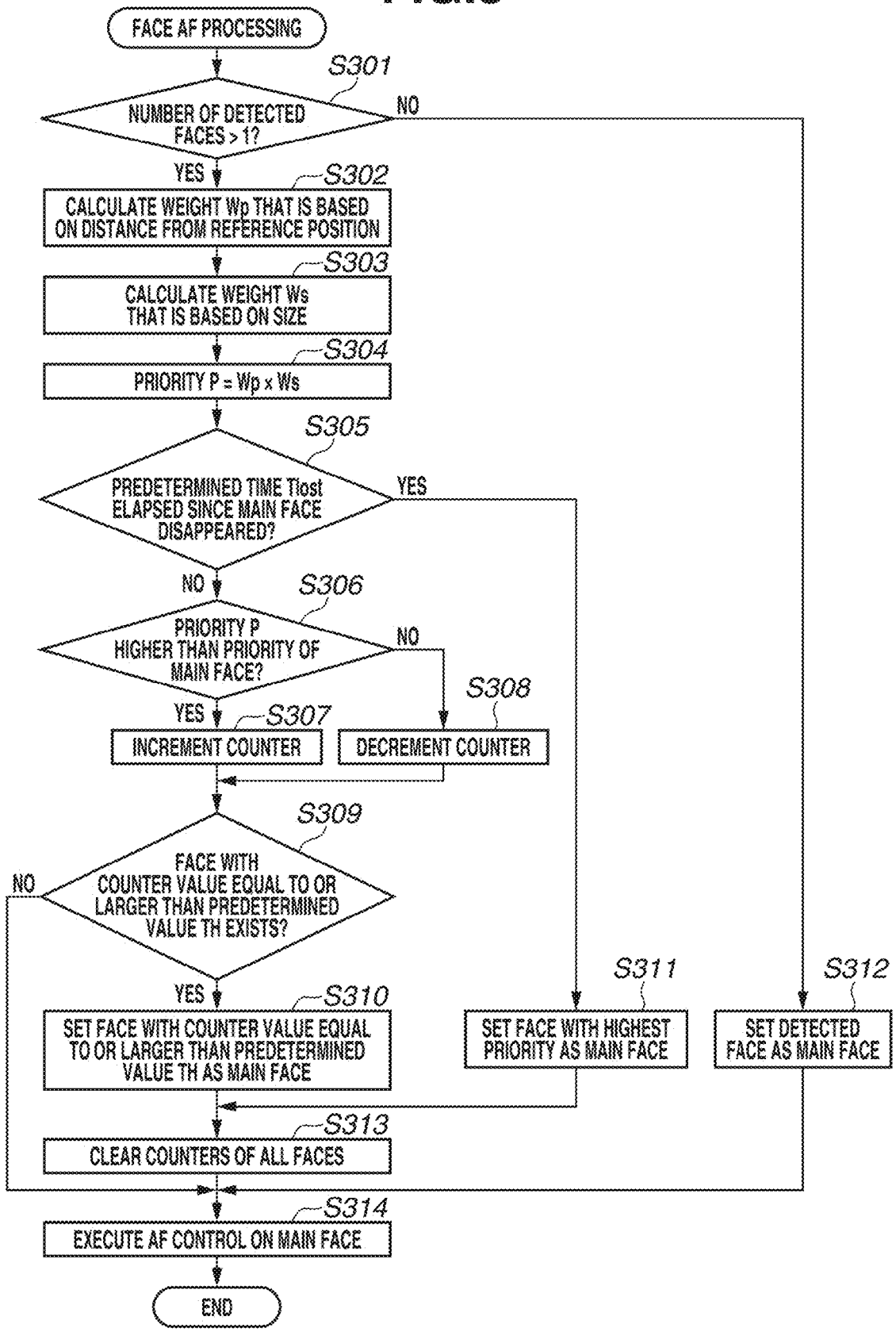
FIG. 3 is a flowchart illustrating face AF processing.

FIG. 3 is a flowchart illustrating a flow of processing of face AF control performed in step S207 of FIG. 2. In step S301, the camera control unit 115 determines whether faces of a plurality of persons have been detected, based on the detection result and the tracking result acquired in step S204 of FIG. 2, by determining whether the number of detected faces is larger than one. Then, in a case where it is determined that faces of a plurality of persons have been detected (YES in step S301), the processing proceeds to step S302. In a case where it is determined that the number of detected faces is one (NO in step S301), the processing proceeds to step S312.

Counter information (hereinafter, will be simply referred to as counter) to be described below is allocated to each of the faces detected by the subject detection/tracking unit 114. Specifically, this counter is stored in a predetermined storage region ensured in the above-described buffer, in association with each of the faces detected in step S204. If it can be determined that a detected person is the same person as the person detected lastly, a counter stored in association with a face detected lastly is taken over as-is.

The number of the counters prepared (ensured in the buffer) corresponds to the number of face detection positions that can be displayed on one screen. For example, if a user interface (UI) can display face detection results corresponding to 30 persons at one time, 30 counters are prepared as well. In a case where a face continuously detected so far, as the face of the same person becomes undetectable in step S204, a counter associated with the person is cancelled. In contrast, in a case where a face of a new person who had not been detected so far has been detected in step S204, a new counter (with a counter value 0) is associated with the face of the new person, and counting is started from 0.

Figure 12A:
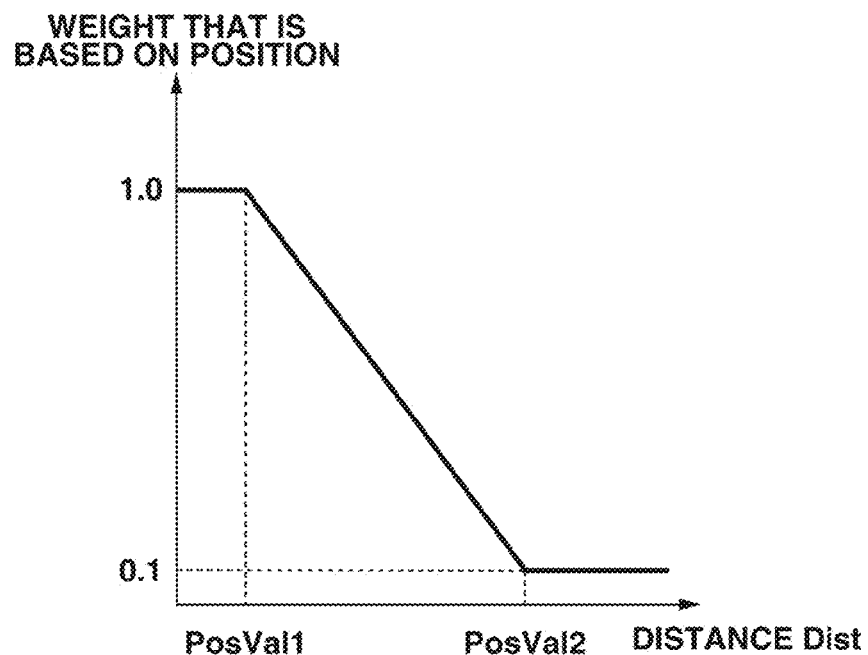
FIGS. 12A and 12B are schematic diagrams illustrating weighting characteristics for the priority of a face.
Figure 12B:
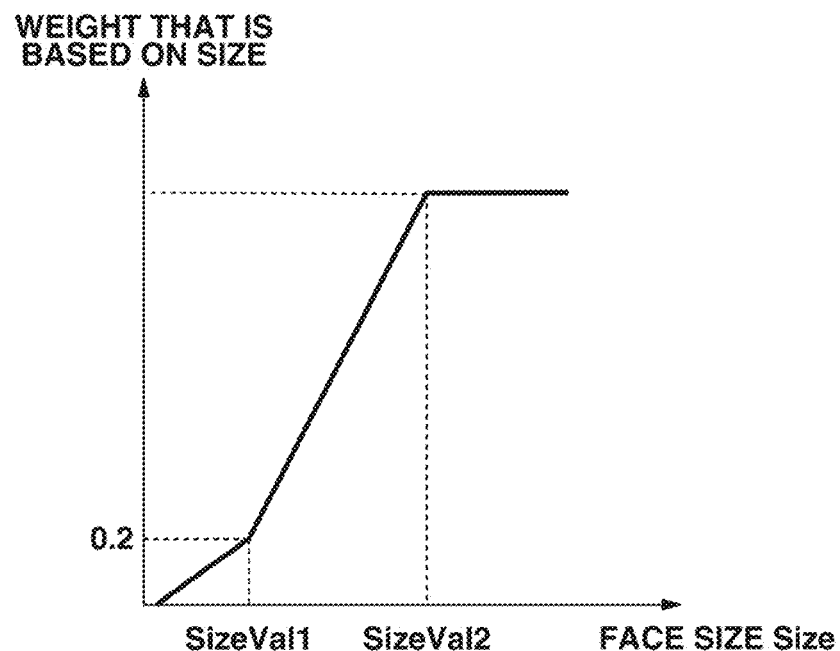

Subsequently, in steps S302 to S304, the camera control unit 115 calculates a priority of main face determination in the current captured image for each of the detected faces. A priority of main face determination will be described with reference to FIGS. 12A and 12B. FIG. 12A illustrates a graph indicating the characteristic of a weight Wp of a priority of a face with respect to a distance from reference coordinates of a detected face. Based on the distance (Dist) from the reference coordinates (RefX, RefY) to the central coordinates (PosX, PosY) of the detected face that is illustrated in FIG. 11A, the weight Wp of the priority of the face is determined. In the present exemplary embodiment, the weight Wp of the priority is set in such a manner as to become higher as the central coordinates get closer to the reference coordinates (in this example, assumed to be the central coordinates of a captured image) (as a value of a horizontal axis becomes smaller in FIG. 12A). In addition, the weight Wp of the priority is set in such a manner as to become lower as the central coordinates get farther from the reference coordinates (in this example, gets closer to the peripheral part of the captured image) (as a value of the horizontal axis becomes larger in FIG. 12A). For example, the weight Wp is set in such a manner that, in a case where a value of the distance Dist satisfies PosVal1<PosVal2, when the value of the distance Dist is PosVal1, the weight Wp is set to 1.0, when the value of the distance Dist is PosVal2, the weight Wp is set to 0.1, and the weight Wp linearly changes between PosVal1 and PosVal2. FIG. 12B illustrates a graph indicating the characteristic of a weight Ws of a priority of a face with respect to a detected face size. Based on the face size Size illustrated in FIG. 11A, a priority of the face is determined. In the present exemplary embodiment, the weight Ws of the priority is set in such a manner as to become higher as the face size Size becomes larger (as a value of a horizontal axis becomes larger in FIG. 12B), and become lower as the face size Size becomes smaller (as a value of the horizontal axis becomes smaller in FIG. 12B). For example, the weight Ws is set in such a manner that, when the value of the face size Size is 0, the weight Ws is set to 0, when the value of the face size Size is SizeVal1, the weight Ws is set to 0.2, and the weight Ws linearly changes between 0 and SizeVal1. The weight Ws is set in such a manner that, in a case where the value of the face size Size is larger than SizeVal2, the weight Ws of the priority is set to 1.0, and the weight Ws linearly changes between SizeVal1 and SizeVal2.

A face having the largest value of a priority after these weights are multiplied (or these weights are added) can be determined to be a face most likely to be a main face in a corresponding frame. In general image capturing, framing is often performed in such a manner that a main subject with a certain level of size exists at the screen center. Thus, in the present exemplary embodiment, a face with a large face size that exists near the center of a captured image is likely to be determined to be a main face.

In step S302, as described with reference to FIG. 12A, the weight Wp of a priority of a face is calculated based on the distance (Dist) from the reference coordinates (RefX, RefY) for each of the detected faces. In step S303, as described with reference to FIG. 12B, the weight Ws of a priority of a face is calculated based on the face size Size for each of the detected faces. In step S304, a priority P is calculated by multiplying the weight Wp set in accordance with the position of the face, and the weight Ws set in accordance with the face size. The above-described priority is only required to be calculated based on at least one of a size of a detected face and a position in a captured image of the face. For example, in the case of calculating a priority based only on the size of the detected face, it is sufficient that a weight set in accordance with the position of the face in a screen is set to 1 and the weight is multiplied by a weight set in accordance with a face size. A calculation method of the priority P is not limited to this. The priority P may be calculated by adding after each weight is multiplied by a coefficient, instead of merely multiplying the weights together.

Subsequently, in step S305, based on the above-described matching result, the camera control unit 115 determines whether a face that can be regarded as the same person as a face of a person determined to be a main face in the last face detection exists among faces detected from the current captured image. In a case where the face does not exist, the camera control unit 115 determines whether a time equal to or larger than a predetermined time Tlost has elapsed since the main face disappeared. In a case where the face exists among faces detected from the current captured image, or even if the face does not exist, in a case where the elapsed time is smaller than the predetermined time Tlost (NO in step S305), the processing proceeds to step S306. In a case where a time equal to or larger than the predetermined time Tlost has elapsed since the face of the person determined to be the main face disappeared from the current captured image (YES in step S305), the processing proceeds to step S311. In step S311, a face having the highest priority at the time point is newly determined to be a main face, and the processing proceeds to step S313. In step S312, because the number of detected faces is one, the detected face is determined to be a main face, and the processing proceeds to step S314.

In step S306, the camera control unit 115 compares the priority of the face determined to be a main face in the last face detection, and priorities of the other faces. In the comparison, the camera control unit 115 determines whether the priority P of the face is higher than the priority of the main face. In a case where the priority P of the face is higher than the priority of the main face (YES in step S306), the processing proceeds to step S307. In step S307, the camera control unit 115 increments a counter value (the number of times the priority P exceeds the priority of the main face) of a counter associated with the face. On the other hand, in a case where the priority P of the face falls below the priority of the main face (NO in step S306), the processing proceeds to step S308. In step S308, the camera control unit 115 decrements a counter value of the counter associated with the face. In other words, the camera control unit 115 is a counting unit that counts the number of times the priority of a different face other than the main face exceeds the priority of the main face, for each of the other faces. A counter value of a counter associated with each face indicates a frequency at which each face becomes more likely to be a main face than the already-detected main face. Accordingly, in a case where this counter value is large, a corresponding face is more suitable as a main face. The counter value indicates a frequency at which the priority of each face becomes higher than the priority of a face determined to be a main face at the time point, and does not indicates by how much degree the priority is higher or lower.

Subsequently, in step S309, the camera control unit 115 determines whether a face with an associated counter value equal to or larger than a preset predetermined value TH exists. In a case where a face with a counter value equal to or larger than the predetermined value TH exists (YES in step S309), the processing proceeds to step S310. In a case where a face with a counter value equal to or larger than the predetermined value TH does not exist (NO in step S309), the processing directly proceeds to step S314. In step S310, the camera control unit 115 newly sets the face with the counter value equal to or larger than the predetermined value TH as a main face, and the processing proceeds to step S313. In step S313, the camera control unit 115 clears counter values of all faces, and the processing proceeds to step S314.

The above-described predetermined value TH is assumed to be preset in a memory with reference to an interval at which main face determination control is performed. In step S313, the camera control unit 115 clears counter values of all faces to prevent a main face from immediately switching to a different face by a counter value of the different face being incremented immediately after the main face switching. With this configuration, main face switching is always performed at a fixed interval (the number of times the processing in steps S301 to S314 is performed exceeds at least a predetermined value). Fairly infrequently, in a case where counter values of a plurality of faces simultaneously exceeds the predetermined value TH, a face with the highest priority order among faces detected from the current captured image is set as a new main face.

As described above, in a case where the priority of the same face becomes higher than the priority of the current main face a predetermined number of times, by determining the face to be a main face, it is possible to prevent a main face from switching extremely frequently while respecting a change in the state of a subject existing in a captured image. In addition, the priority is calculated based on face sizes and face positions detected from consecutively-captured images, and the past face size and face position does not affect the calculation. Accordingly, in a case where the priority of the same face is higher than the priority of the current main face in a plurality of consecutively-captured images, and it is determined that the main face is to be switched, from the viewpoint of the user, it is possible to properly switch the main face.

In step S314, the camera control unit 115 sets a region to be used in focus detection, based on a main face position selected in the processing up to step S313, performs AF control in the region, and ends the processing. Because performing AF control in a predetermined region is a known technique, the description thereof will be omitted. In the present exemplary embodiment, a region to be used in focus detection is set based on a main face position selected in the processing up to step S313, but a region to be used in exposure control or white balance control may be set.

Figure 4:
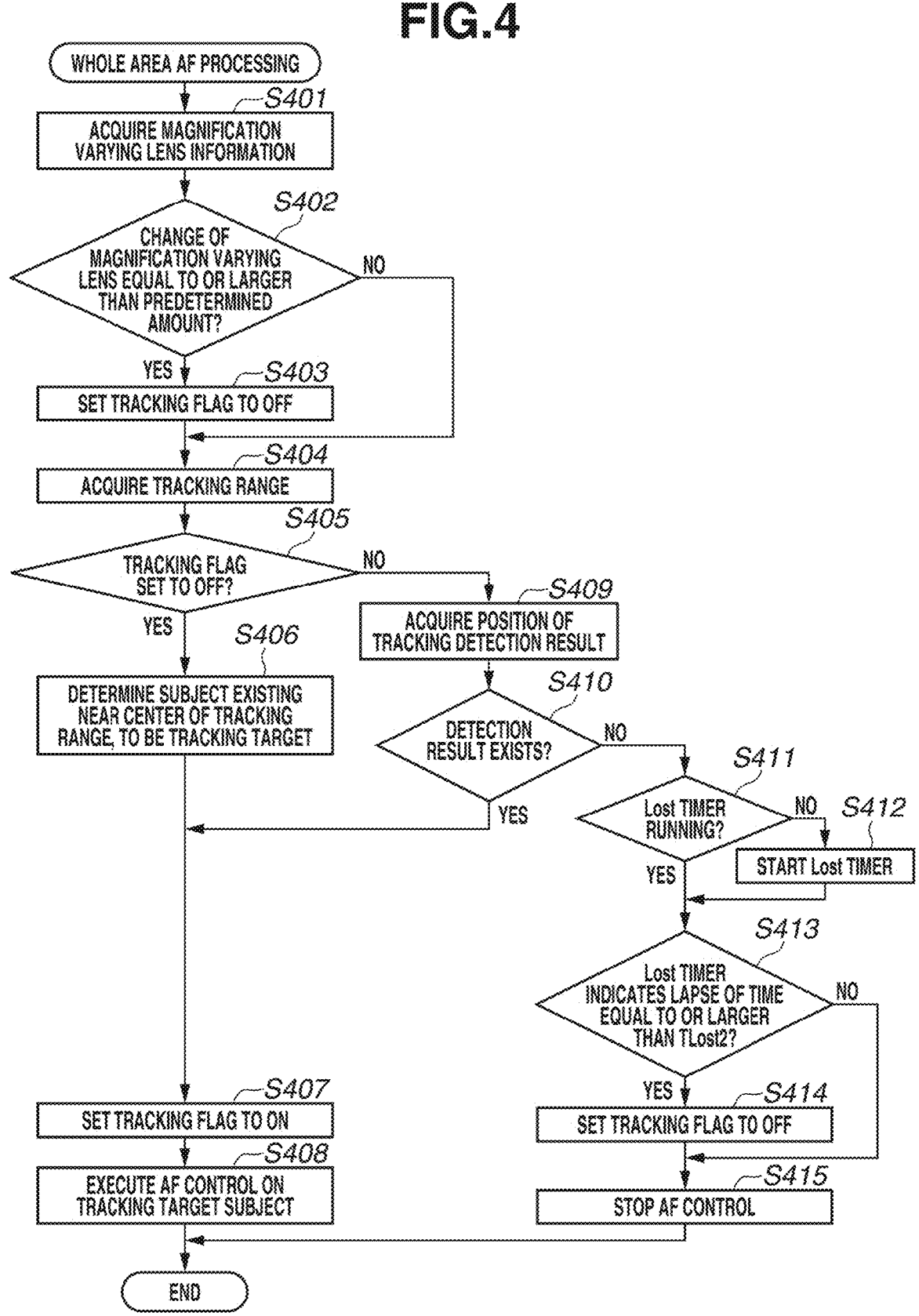
FIG. 4 is a flowchart illustrating whole area AF processing.

FIG. 4 is a flowchart illustrating a flow of processing of whole area AF control to be performed in step S208 of FIG. 2.

In step S401, the camera control unit 115 acquires information regarding the magnification varying lens 102.

In step S402, the camera control unit 115 determines whether a change of the magnification varying lens 102 is equal to or larger than a predetermined amount. In a case where the magnification varying lens 102 has changed by the predetermined amount or more (YES in step S402), the processing proceeds to step S403. In a case where the magnification varying lens 102 has not changed by the predetermined amount or more (NO in step S402), the processing proceeds to step S404.

In step S403, the camera control unit 115 sets a tracking flag to OFF. This is performed with a view to resetting a subject targeted by the user, as a tracking target by setting the tracking flag to OFF because it can be determined that a subject might have changed, based on the change equal to or larger than the predetermined amount. In the present exemplary embodiment, an enlargement ratio of 10% is set as a threshold value. The effect of the processing will be described below with reference to FIGS. 16I to 16L.

In step S404, the camera control unit 115 performs processing of acquiring a tracking range set in step S203.

In step S405, the camera control unit 115 determines whether the tracking flag is set to OFF. In a case where the tracking flag is set to OFF (YES in step S405), the processing proceeds to step S406. In a case where the tracking flag is not set to OFF (NO in step S405), the processing proceeds to step S409.

In step S406, the camera control unit 115 determines a nearby subject near the center of the tracking range to be a main subject, and sets the subject as a tracking target.

In step S407, the camera control unit 115 performs processing of setting the tracking flag to ON.

In step S408, the camera control unit 115 performs AF control in the region set as the tracking target as the main subject selected in the processing up to step S407, and ends the processing. Because performing AF control in a predetermined region is a known technique, the description thereof will be omitted.

In step S409, the camera control unit 115 acquires the position of a detection result of the tracking subject detected in step S204.

In step S410, the camera control unit 115 determines whether a detection result exists. In a case where a detection result exists (YES in step S410), the processing proceeds to step S407. In a case where a detection result does not exist (NO in step S410), the processing proceeds to step S411.

In step S411, the camera control unit 115 determines whether the Lost timer is running. In a case where the Lost timer is running (YES in step S411), the processing proceeds to step S413. In a case where the Lost timer is not running (NO in step S411), the processing proceeds to step S412.

In step S412, the camera control unit 115 performs processing of starting the Lost timer.

In step S413, the camera control unit 115 performs processing of determining whether the Lost timer indicates the lapse of a time equal to or larger than a predetermined time TLost2. An arbitrary time can be set as the predetermined time TLost2. In the present exemplary embodiment, the predetermined time TLost2 will be described below with reference to FIGS. 8 and 9. In a case where the Lost timer indicates the lapse of a time equal to or larger than the predetermined time TLost2 (YES in step S413), the processing proceeds to step S414. In a case where the Lost timer does not indicate the lapse of a time equal to or larger than the predetermined time TLost2 (NO in step S413), the processing proceeds to step S415.

In step S414, the camera control unit 115 performs processing of setting the tracking flag to OFF.

In step S415, the camera control unit 115 performs processing of stopping AF control, and ends the processing.

The processing in steps S410 to S415 is a recovery measure to be taken in a case where a tracking target determined to be a main subject has not been detected. During image capturing, a subject sometimes falls outside a tracking range due to camera shake. If a new subject is set as a tracking although a subject falls outside the tracking range just momentarily, the quality of a moving image declines. Thus, even in a case where a subject falls outside the tracking range, to wait for the subject for a fixed standby time because the subject might come back to the inside of the tracking range again, the Lost timer is set. While the Lost timer is running, because AF control is stopped, it becomes possible to prevent AF control from being executed on a subject other than a subject targeted by the user.

Referring back to FIG. 2, processing in step S209 and subsequent steps that is to be executed in a state in which a PT operation has been performed will be described. In the processing in step S209 and subsequent steps, the above-described face AF control and whole area AF control are changed depending on whether the PT operation is an operation for following a subject that has been detected and is being tracked, or an operation for a subject change (or field angle change) without following a subject. With this configuration, the camera control unit 115 selects a subject in view of the intention of the user, and performs AF frame following and AF control.

In step S209, the camera control unit 115 performs subject following determination processing of determining whether the PT operation is an operation for following a subject that has been detected and is being tracked, or an operation for a field angle change without following a subject. The details will be described below with reference to FIG. 5.

FIGS. 5 and 15A to 15F are diagrams illustrating a flow of subject following determination processing.

As a basic determination method, there are two patterns to be described below.

In a pattern 1, in a case where it is determined in step S501 that a subject following menu is set to ON in a mode setting, a "subject following flag is set to ON" without any condition. In a pattern 2, in a case where the subject following menu is set to OFF, based on a relationship between (1) a subject tracking result and (2) a following determination range, if (1) the subject tracking result falls within (2) the following determination range, the "subject following flag is set to ON".

Concept will be described with reference to FIGS. 15A to 15F.

Figure 15A:
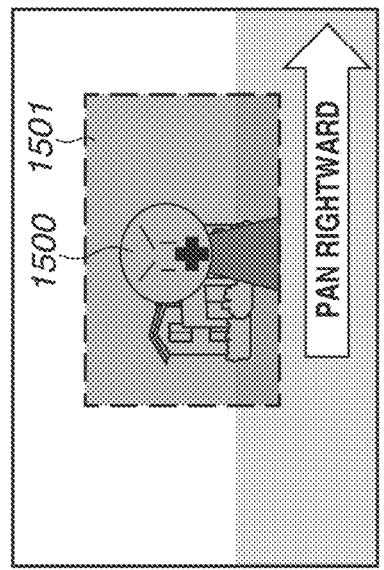
FIGS. 15A to 15F are diagrams illustrating subject following determination processing.

FIG. 15A is a diagram illustrating a stopped state before panning. A subject targeted by the user is a subject 1500. The subject 1500 corresponds to a result (face detection result or tracking result) detected in step S204. A subject following determination range 1501 is set with a center located at the position of the subject 1500. The size of the subject following determination range 1501 is set in such a manner that a width 1503 in a horizontal direction is about 40% of a width of a screen, and a height 1502 in a vertical direction is about 40% of a height of the screen. The value is an example, and may be changed depending on an image capturing magnification.

Figure 15B:
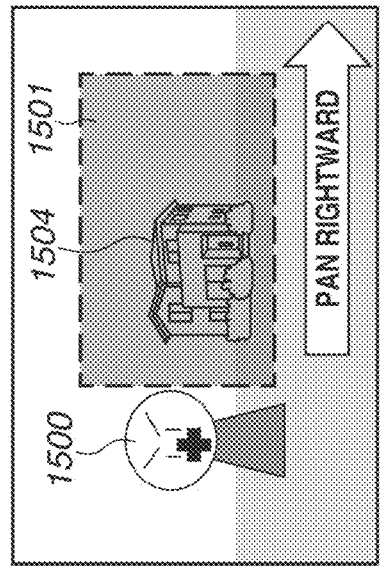

FIG. 15B is a diagram illustrating a state caused in a case where a subject has changed during panning. FIG. 15B illustrates a state obtained by panning the state in FIG. 15A rightward. FIG. 15B illustrates that a subject targeted by the user has changed from the subject 1500 to a subject 1504, and the subject 1500 has fallen outside the subject following determination range 1501. That is, this means that a subject has not moved in synchronization with panning. In this case, a camera determines that "the subject is desired to be changed".

Figure 15C:
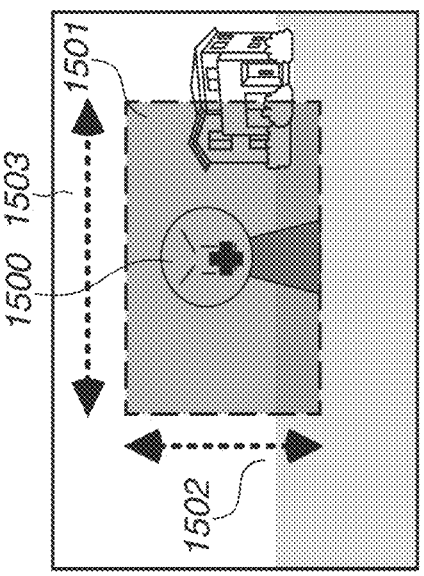

FIG. 15C is a diagram illustrating a state caused in a case where a subject remains unchanged during panning. FIG. 15C illustrates a state obtained by panning the state in FIG. 15A rightward. FIG. 15C illustrates that the subject 1500 has been maintained as a subject targeted by the user, and the subject 1500 has not fallen outside the subject following determination range 1501. That is, this means that a subject has moved in synchronization with panning. In this case, a camera determines that "the subject is desired to be followed".

Figure 15D:
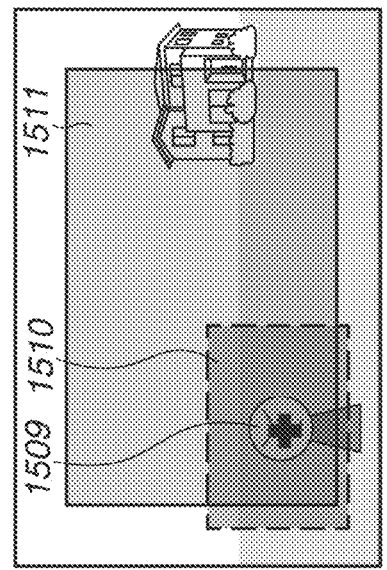
Figure 15E:
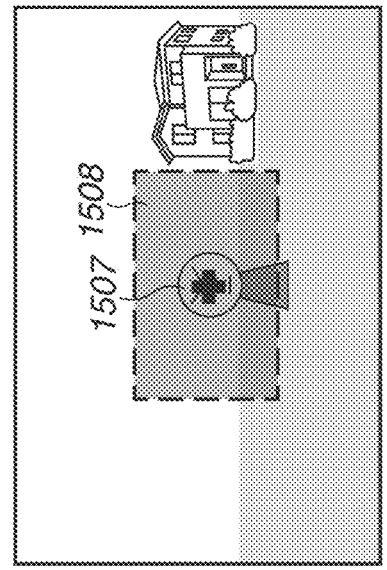

FIGS. 15D and 15E are diagrams illustrating the influence caused by a difference in image capturing magnification. Based on a relationship between a focal length and a distance to a subject, an image capturing magnification coefficient is defined as follows.

Image capturing magnification coefficient $K$=Focal length [mm]/Distance to subject [mm]

If the coefficient becomes larger, the size of a subject becomes larger, and if the coefficient becomes smaller, the size of a subject becomes smaller.

FIG. 15D illustrates a subject 1505 image-captured in a case where the image capturing magnification coefficient K is large. In this case, a ratio of the subject 1505 with respect to a screen becomes large. In a case where the subject 1505 moves or in a case where a camera moves, a possibility that the subject 1505 falls outside the screen becomes higher. Thus, by setting a subject following determination range 1506 to have a larger size than the subject following determination range 1501, it becomes possible to execute determination suitable for the subject 1505.

FIG. 15E illustrates a subject 1507 image-captured in a case where the image capturing magnification coefficient K is small. In this case, a ratio of the subject 1507 with respect to a screen becomes small. In a case where the subject 1507 moves or in a case where a camera moves, a possibility that the subject 1507 falls outside the screen becomes lower. Thus, by setting a subject following determination range 1508 to have a smaller size than the subject following determination range 1501, it becomes possible to execute determination suitable for the subject 1507.

That is, the subject following determination ranges 1501, 1506, and 1508 are characterized in that the subject following determination ranges 1501, 1506, and 1508 have sizes variable in accordance with the image capturing magnification coefficient K. For example, in a case where an upper limit is set to 80% of a screen and a lower limit is set to 30% of the screen, within this range, a size is changed in accordance with the image capturing magnification coefficient K.

Figure 15F:
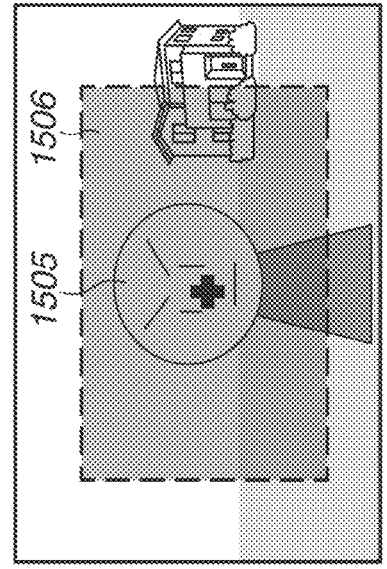

Next, FIG. 15F is a diagram illustrating a subject following determination range 1510 and a detection tracking range 1511 for a subject 1509. In a case where the subject 1509 is positioned at a screen end, the subject following determination range 1510 might fall outside the detection tracking range 1511. In this case, the subject following determination range 1510 is desirably set within a range not falling outside the detection tracking range 1511. This is because in a case where the subject following determination range 1510 falls outside the detection tracking range 1511, a possibility that the subject 1509 is not a main subject is high.

A relationship between a "threshold value of a pan/tilt amount of a subject following determination start" and a "horizontal/vertical range of subject following determination" is defined based on a ratio of change with respect to a screen, and the following items are used as a target.

(1) The horizontal/vertical range of subject following determination: (e.g.) a range corresponding to 40% of the screen is set
(2) The threshold value of the pan/tilt amount of the subject following determination start: (e.g.) a change larger than 20% of the screen
(3) The above-described items (1) and (2) are set in such a manner as to satisfy ((1)/2)<(2).

This is because determination accuracy improves by determining whether a targeted subject falls within the range defined by the item (1), even in a case where pan/tilt with about a half pan/tilt amount of the range set by the item (2) occurs.

Subsequently, a flowchart illustrating a flow of subject following determination processing will be described with reference to FIG. 5.

In step S501, the camera control unit 115 determines whether a subject following menu setting is set to OFF. In a case where a subject following menu setting is set to OFF (YES in step S501), the processing proceeds to step S502. In a case where a subject following menu setting is not set to OFF (NO in step S501), the processing proceeds to step S514.

In step S502, the camera control unit 115 performs processing of acquiring the position of a detection/tracking result detected in step S204.

In step S503, the camera control unit 115 performs processing of acquiring information regarding a panning (Pan) operation and a tilting (Tilt) operation from the operation unit 302 of the controller 300 operated by the user.

In step S504, the camera control unit 115 determines whether the information acquired in step S503 includes a difference. In a case where the information includes a difference (YES in step S504), it is determined that a PT operation has been performed, and the processing proceeds to step S505. In a case where the information does not include a difference (NO in step S504), the processing proceeds to step S508.

In step S505, the camera control unit 115 determines whether a determination start flag is set to OFF. In a case where the determination start flag is set to OFF (YES in step S505), the processing proceeds to step S506. In a case where the determination start flag is not set to OFF (NO in step S505), the processing proceeds to step S509.

In step S507, the camera control unit 115 performs processing of setting a following determination range, and ends the processing.

In step S508, the camera control unit 115 performs processing of setting the determination start flag to OFF.

In step S509, the camera control unit 115 determines whether a difference in pan tilt is equal to or larger than Th. If the difference is equal to or larger than Th (YES in step S509), the processing proceeds to step S510. In a case where the difference is not equal to or larger than Th (NO in step S509), the processing proceeds to step S513.

In step S510, the camera control unit 115 performs processing of setting the determination start flag to OFF.

In step S511, the camera control unit 115 determines whether a detection result falls within a following determination range. In a case where a detection result falls within a following determination range (YES in step S511), the processing proceeds to step S512. In a case where a detection result does not fall within a following determination range (NO in step S511), the processing proceeds to step S513.

In step S512, the camera control unit 115 sets the subject following flag to ON, and ends the processing.

In step S513, the camera control unit 115 sets the subject following flag to OFF, and ends the processing.

In step S514, the camera control unit 115 sets the subject following flag to ON, and ends the processing. Heretofore, the description has been given with reference to FIG. 5.

Subsequently, in step S210, similarly to step S206 described above, the camera control unit 115 determines whether a face region of a person has been detected/is being tracked, based on the detection/tracking result acquired in step S204. Then, in a case where a face region of a person has been detected/is being tracked (YES in step S210), the processing proceeds to step S211. In a case where a face region of a person has not been detected/is not being tracked (NO in step S210), the processing proceeds to step S214. The processing in steps S211 to S213 is processing related to face AF control, and the processing in steps S214 to S216 is processing related to whole area AF control.

In step S211, the camera control unit 115 determines whether a subject following determination result obtained in step S209 indicates "following". In a case where the subject following determination result indicates "following" (YES in step S211), the processing proceeds to step S212. On the other hand, in a case where it is determined that the subject following determination result indicates "not following" (i.e., the subject following determination result indicates that a subject change (or a field angle change) is to be performed, the processing proceeds to step S213.

In step S212, the camera control unit 115 performs face AF control suitable for a PT operation for following the subject that has been detected and is to be tracked. In step S213, the camera control unit 115 performs face AF control suitable for a PT operation for changing a subject. The details will be described below with reference to flowcharts in FIGS. 6 and 7.

Figure 6:
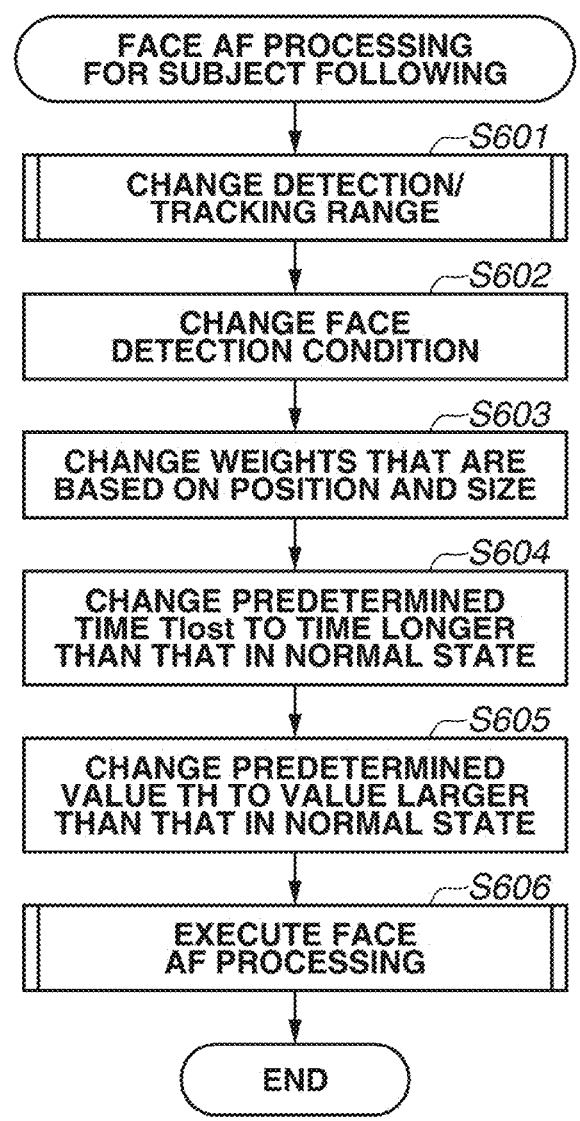
FIG. 6 is a flowchart illustrating face AF processing for subject following according to an exemplary embodiment.

FIG. 6 is a flowchart illustrating a flow of processing of face AF control suitable for a PT operation of following a subject detected and being tracked that is to be executed in step S212 of FIG. 2.

In step S601, the camera control unit 115 changes parameters defining the detection/tracking range set in step S203 of FIG. 2, to parameters suitable for a PT operation of following a subject. The details will be described with reference to FIG. 10. In the present exemplary embodiment, the camera control unit 115 expands a detection/tracking range as compared with that in a normal state, with a view to making detection and tracking of the current main face maintainable as far as possible. For example, in a case where the detection/tracking range is set to about 60% of an image capturing field angle in the normal state, in the processing in step S601, the camera control unit 115 expands the detection/tracking range up to about 80% of the image capturing field angle.

In step S602, the camera control unit 115 changes a face detection condition. The face detection condition will be described. The subject detection/tracking unit 114 performs known face detection processing on image data, and detects a face region of a person within an image capturing screen. As conditions under which a face is detected, at least threshold values of a lower limit size and an upper limit size of detection, a direction state of a face, and a reliability of detection can be set. For example, in a case where image capturing is performed in such a manner that a whole body of a person just falls within an image capturing field angle, a face size generally becomes about 3 to 4% of the image capturing field angle. In the case of detecting such a small face, such an issue that a person existing in the background and being other than a subject targeted by the user is also detected, and a focus is put on the wrong person without intent can occur. In view of the foregoing, by setting the lower limit size to 5%, it is possible to prevent a face smaller than this from being detected. Furthermore, there is also such an issue that, in a case where a size of a subject to be image-captured is predetermined, if a too large face is detected, a face of an unintended person is determined to be a main face, and a focus is put on the face. Thus, by setting an upper limit size as well, it is possible to avoid detecting an unintended subject. As for the direction state of the face, for example, in a case where direction information of the face that is included in a detection/tracking result indicates 90 degrees in the leftward direction, 45 degrees in the leftward direction, full-faced, 45 degrees in the rightward direction, 90 degrees in the rightward direction, or indeterminate (backward-looking), when the face of a person is full-faced or one of faces toward 45 degrees in the leftward/rightward direction, a face of the person is highly likely to be a subject desired by the user to be image-captured. On the other hand, when a person looks away or looks backward, a face of the person is highly likely to be an unintended subject. Thus, it is possible to avoid detecting faces oriented toward 90 degrees in the leftward/rightward direction and a face in an indeterminate direction (backward). As for the reliability of face detection, in a case where the reliability is represented in ten levels from 1 to 10 as described above, it is possible to avoid detecting faces with low reliabilities such as the reliabilities of 7 to 10, for example.

In the face detection condition change in step S602, because the PT operation is an operation for following the current main face, to avoid detecting faces of persons other than the main face being followed, as far as possible, a lower limit size and an upper limit size of face detection are set based on the current main face size. For example, a lower limit size and an upper limit size of face detection are set in such a manner that a face with a size from 0.5 times to 1.5 times of the current main face size can be detected. The direction state of the face is set in such a manner as not to detect a face oriented toward an indeterminate direction (backward). Furthermore, the threshold value of the reliability of face detection is set in such a manner that a face is detected when a reliability falls within 1 to 7, which can be regarded as high reliability. By changing face detection conditions in this manner, and making faces of persons other than a main face less likely to be detected, it is possible to reduce the number of candidates of faces that can serve as a main face, and reduce the possibility of main face switching to an unintended face.

Figure 13A:
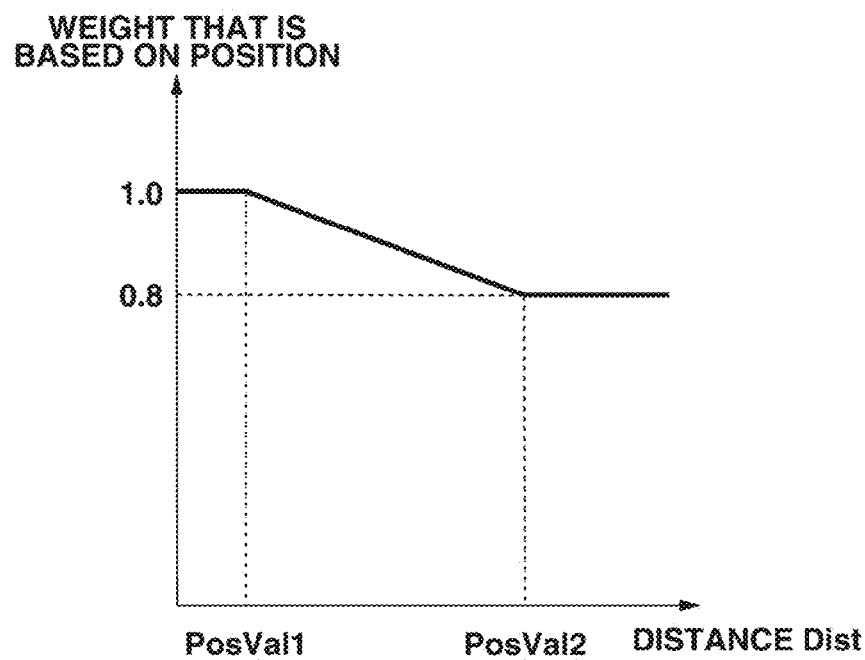
FIGS. 13A and 13B are schematic diagrams illustrating weighting characteristics for the priority of a face that is observed during subject following.
Figure 13B:
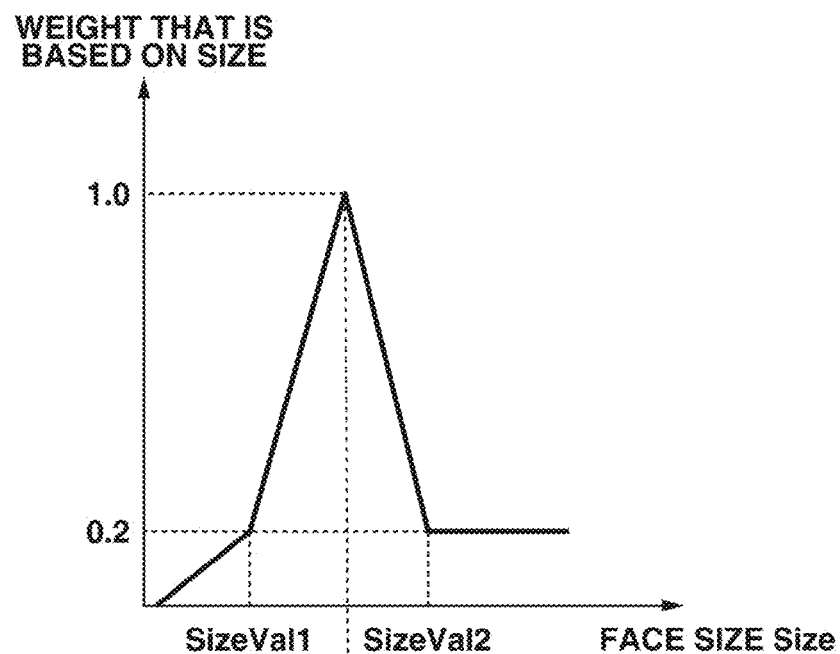

In step S603, the camera control unit 115 changes the weight Wp of a priority of a face with respect to a distance from reference coordinates of a detected face, and the weight Ws of a priority of a face with respect to a detected face size, which have been described above. FIG. 13A illustrates a graph indicating the characteristic of the weight Wp of a priority of a face with respect to a distance from reference coordinates of a detected face that has been changed in step S603. Unlike the characteristic illustrated in FIG. 12A, the weight Wp of the priority of a face is set in such a manner as to become high even if the distance Dist from the reference coordinates is large. In the present exemplary embodiment, the weight Wp is set in such a manner that, when a value of the distance Dist is PosVal2, the weight Wp is set to 0.8, and the weight Wp linearly changes between PosVal1 and PosVal2. With this configuration, as compared with the characteristic illustrated in FIG. 12A, even if a main face moves to a screen peripheral part, it is possible to maintain a state in which the priority is high, and prevent the main face from switching to a different face. FIG. 13B illustrates a graph indicating the characteristic of the weight Ws of a priority of a face with respect to a detected face size that has been change in step S603. Unlike the characteristic illustrated in FIG. 12B, the weight Wp of the priority of a face is set in such a manner as to become the highest when a face size Size is SizeVal3 when a size of the current main face is SizeVal3. In the present exemplary embodiment, when the face size Size is SizeVal3, the weight Wp is set to 1.0, and the weight Wp linearly changes between SizeVal1 and SizeVal3, and SizeVal3 and SizeVal2. With this configuration, as compared with the characteristic illustrated in FIG. 12B, it is possible to maintain a state in which the priority of the current main face is high, and prevent the main face from switching to a different face.

In step S604, the camera control unit 115 changes the predetermined time Tlost being a threshold value of a time since a main face disappeared to be used in the determination in step S305 of FIG. 3, to a time longer than that in the normal state. By changing the predetermined time Tlost in this manner, it is possible to prolong a time for which the current main face is maintained, without switching the main face to a different face immediately after the main face enters an undetectable state.

In step S605, the camera control unit 115 changes the predetermined value TH being a threshold value of a counter to be used in the determination in step S309 of FIG. 3, to a value larger than that in the normal state. By changing the predetermined value TH in this manner, it is possible to make the main face easily-maintainable because a time until the main face is switched since the calculated priority of the face exceeds the priority of the current main face becomes longer. In the present exemplary embodiment, the description has been given of the configuration in which the predetermined value TH being a threshold value of a counter is set to a value larger than that in the normal state. Nevertheless, by setting this value to an extremely-large value such as infinity, for example, or by avoiding determining whether a counter value exceeds the predetermined value TH, a main face may be fixed to a current face and main face switching may be avoided.

In step S606, the camera control unit 115 performs face AF control described in FIG. 3, using the settings changed in steps S603 to S605. Because a flow of processing of face AF control is the same as that illustrated in FIG. 3, the description will be omitted.

An effect of face AF control for subject following will be exemplified with reference to FIGS. 14A to 14C. FIG. 14A is a conceptual diagram illustrating a positional relationship between subjects (face A and face B) and a detection/tracking range at a field angle set before a PT operation. FIG. 14B is a conceptual diagram illustrating a case where a different subject (face B in this example) enters the detection/tracking range when panning is executed rightward in such a manner that the face A is located at a position as closer as possible to the center of an image capturing field angle, in accordance with a rightward movement of the face A being the current main face. In FIGS. 14A to 14F, a face of a person falling within a detection/tracking range 1401 is to be detected, a face frame (square bracket) is displayed on a detected face, and display is made different between a main face and other faces. For example, as illustrated in FIG. 14A, a face frame with left and right pointing arrows that is placed on the face A will be hereinafter described as a frame of a main face. In the case of the panning operation illustrated in FIG. 14A, considering that the user has an intention of keeping the face A set as the main subject, even if the face B enters an image capturing field angle, it is desirable to execute AF control with the face A maintained as the main face. Nevertheless, as described in the face AF processing in the normal state in step S207 of FIG. 2, if the user continues to execute the control of preferentially setting a large face existing near the screen center, as a main face, the priority of the face B being a large face and existing near the center of the image capturing field angle as illustrated in FIG. 14B becomes higher, and the face B is set as a main face. Consequently, the face A intended by the user enters a defocus state and a focus is put on the unintended face B. As described in the face AF processing for subject following in step S212 of FIG. 2, if the user executes face AF control suitable for a PT operation for subject following, by expanding the detection/tracking range 1401 as illustrated in FIG. 14C, it is possible to keep a state in which the detection of the face A is easily maintainable. Furthermore, because a state in which the priority of the face A being a main face is high is easily maintainable, and even if the priority of the face B becomes higher, because a time until a main face is switched is prolonged, the main face is unlikely to switch to the face B, and it becomes possible to keep the face A set as a main face, and continue to put a focus on the face A.

Figure 7:
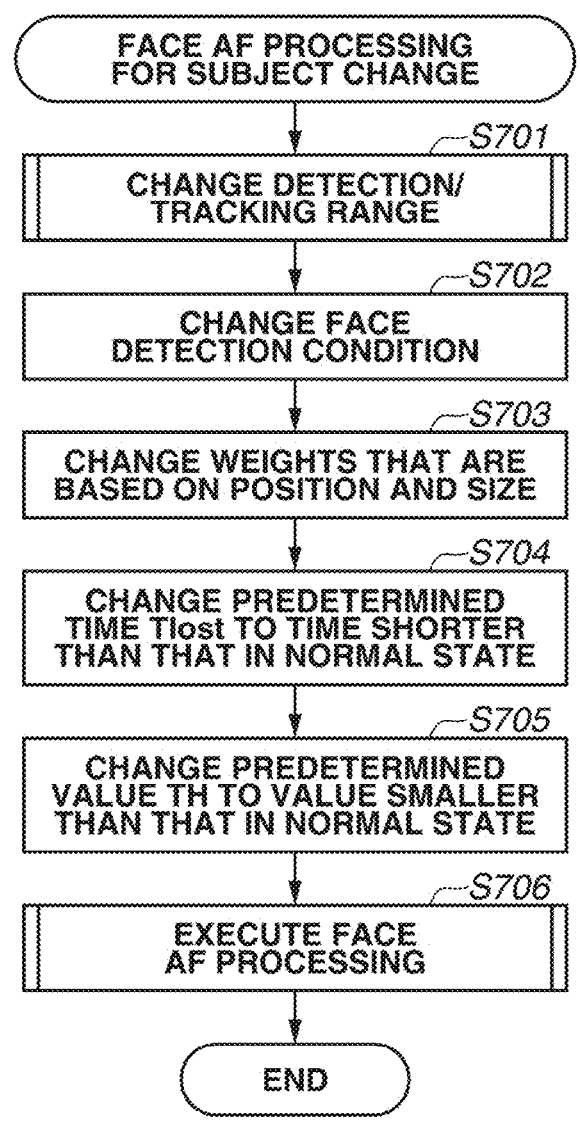
FIG. 7 is a flowchart illustrating face AF processing for subject change according to an exemplary embodiment.

Next, FIG. 7 is a flowchart illustrating a flow of processing of face AF control suitable for a PT operation for changing a subject that is to be executed in step S213 of FIG. 2. In this series of processes, it is assumed that a PT operation is not an operation for following a main face being image-captured, but an operation for changing a subject that is performed also for a field angle change. For this purpose, control is changed in such a manner that detection of a face of a person other than a current main face is easily performed, and a face existing in a PT operation direction is easily set as a main face.

In step S701, the camera control unit 115 changes the detection/tracking range set in step S203 of FIG. 2, to a range suitable for a PT operation for changing a subject. The details will be described with reference to FIG. 10. In the present exemplary embodiment, with a view to avoiding maintaining detection and tracking of a current main face as far as possible, and making a main face easily switchable to a different face, the camera control unit 115 shifts the detection/tracking range toward a PT operation direction as compared with that in the normal state. For example, in a case where the detection/tracking range is set to about 60% of an image capturing field angle and at the center thereof in the normal state, and a PT operation direction is a lower right direction, in the processing in step S701, the camera control unit 115 changes the detection/tracking range to a range corresponding to about 60% of an image capturing field angle that is centered on a lower right area among four areas obtained by dividing the image capturing field angle into four. A shift amount of the detection/tracking range is changed in accordance with a PT speed. When a slow PT operation is performed, a shift amount is made smaller, and when a fast PT operation is performed, a shift amount is made larger. When image capturing of a person is performed, especially in a case where a tilting operation is performed downward, a possibility that a face falls outside a detection/tracking range is high. Thus, it is desirable to set a shift amount of a detection/tracking range to a smaller amount for a tilting operation as compared with a panning operation, and set a shift amount of a detection/tracking range to a further smaller amount especially for a downward tilting operation.

Instead of shifting a detection/tracking range in a PT direction, a detection/tracking range may be set in such a manner as to expand toward the PT direction.

In step S702, the camera control unit 115 changes a face detection condition. Because a PT operation is not an operation for following a current main face, but an operation for changing a subject, by making faces of person other than the current main face easily detectable, the number of faces that can serve as candidates of a main face is increased, and main face switching is made easily executable. For example, by setting a lower limit size of face detection to the smallest detectable size, a small face is made detectable. A threshold value of a reliability of face detection is set in such a manner that a face is detected when a reliability falls within 1 to 9, to detect a face with a lower reliability as compared with a case where a PT operation for following a subject is performed, but the threshold value is not limited to this. Nevertheless, if all faces are made detectable to increase the number of candidate faces that can be set as a main face, a face of a person that is not a subject desired by the user to be image-captured is detected, and intended main face switching might fail to be performed. In view of the foregoing, in the present exemplary embodiment, for example, as for the direction state of a face, it is considered that a backward-looking subject is highly likely to be not a subject desired by the user to be image-captured. Then, similarly to the setting made when a PT operation for following a subject is performed, a setting is made in such a manner as to avoid detecting an indeterminate (backward-looking) face, but the configuration is not limited to this. A backward-looking face may be detected.

Figure 11B:
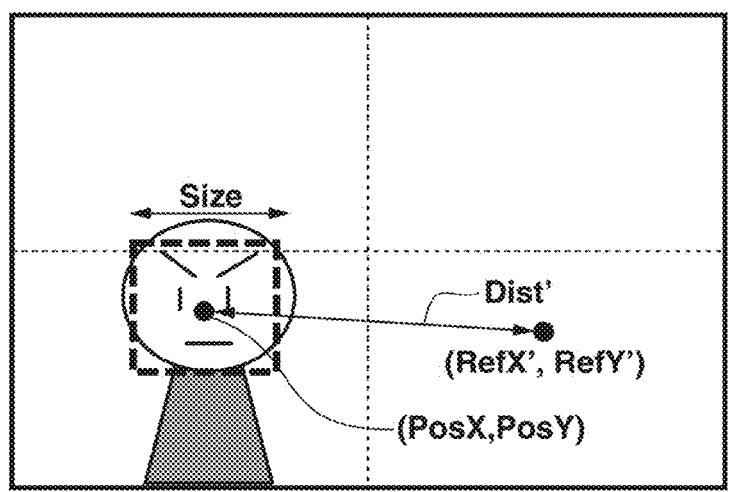

In step S703, the camera control unit 115 changes the weight Wp of a priority of a face with respect to a distance from reference coordinates of a detected face, and the weight Ws of a priority of a face with respect to a detected face size. To make a face existing in a PT operation direction, easily selectable as a main face, as illustrated in FIG. 11B, the reference coordinates in step S703 are coordinates (RefX', RefY') of which the position has been shifted in the PT operation direction from the reference coordinates (RefX, RefY) illustrated in FIG. 11A. In this example, FIG. 11B illustrates a case where a PT operation is performed in the lower right direction, and the reference coordinates are shifted in the lower right direction. At this time, a distance to be used when a weight of a priority of a face with respect to a distance from reference coordinates is calculated is denoted by Dist'. In the present exemplary embodiment, the characteristics of the weight Wp of a priority of a face with respect to a distance from reference coordinates of a detected face, and the weight Ws of a priority of a face with respect to a detected face size are set to the same as the characteristics (FIG. 12A) in the normal state in which a PT operation is not performed. By shifting the reference coordinates to the (RefX', RefY') in the PT operation direction, the priority of a face existing in the PT operation direction becomes higher than priorities of faces existing at the screen center and in a direction opposite to the PT operation direction, and the face existing in the PT operation direction is more likely to be set as a main face. A shift amount of the reference coordinates is changed in accordance with a PT speed. When a slow PT operation is performed, a shift amount is made smaller, and when a fast PT operation is performed, a shift amount is made larger. When image capturing of a person is performed, in a case where a tilting operation is performed with respect to a panning operation, especially in a case where a tilting operation is performed downward, a possibility that a face falls outside a detection/tracking range is high. Thus, it is desirable to set a shift amount of reference coordinates to a smaller amount for a tilting operation as compared with a panning operation, and set a shift amount of reference coordinates to a further smaller amount especially for a downward tilting operation.

In step S704, the camera control unit 115 changes the predetermined time Tlost being a threshold value of a time since a main face disappeared to be used in the determination in step S305 of FIG. 3, to a time shorter than that in the normal state. By changing the predetermined time Tlost in this manner, as soon as a main face enters an undetectable state, the main face is switched to a different face, and a time for which the current main face is maintained can be shortened.

In step S705, the camera control unit 115 changes the predetermined value TH being a threshold value of a counter to be used in the determination in step S309 of FIG. 3, to a value smaller than that in the normal state. By changing the predetermined value TH in this manner, it is possible to make main face switching to a different face easier because a time until the main face is switched since the calculated priority of the face exceeds the priority of the current main face becomes shorter.

In step S706, the camera control unit 115 performs face AF control described in FIG. 3, using the settings changed in steps S703 to S705. Because a flow of processing of face AF control is the same as that illustrated in FIG. 3, the description will be omitted.

An effect of the present exemplary embodiment that is to be obtained in a case where panning is executed toward the direction of the face B existing on the right side in the image capturing field angle, from a state in which AF control is performed on the main face A, and framing is executed in such a manner that the face B exists near the center of the image capturing field angle will be exemplified with reference to FIGS. 14D to 14F. In FIGS. 14D to 14F, because the detection/tracking range 1401 and the display of the face frame are similar to those described with reference to FIG. 14A, the description will be omitted. In the case of the panning operation illustrated in FIG. 14D, considering that the user has an intention of setting the face B as the main subject, it is desirable to execute AF control after switching the main face from the face A to the face B. Nevertheless, as described in the face AF processing in the normal state in step S207 of FIG. 2, if the user continues to execute the control of preferentially setting a large face existing near the screen center, as a main face, the face A being a large face as illustrated in FIG. 14E is continuously set as a main face. Alternatively, even if the priority of the face B becomes higher, the face A is continuously set as a main face for a predetermined time. In this case, because the main face is not promptly switched to the face B, the face B intended by the user remains in a defocus state and a focus is continuously put on the face A. As described in the face AF processing for subject change in step S213 of FIG. 2, if the user executes face AF control suitable for a PT operation for subject change, by shifting the detection/tracking range 1401 in a PT direction as illustrated in FIG. 14F, detection of the face A is easily interrupted. Furthermore, the priority of a face existing in the PT direction is easily made higher, and because a time until the main face is switched since the priority has become higher is shortened, it becomes possible to promptly switch the main face to the face B and put a focus on the face B.

Heretofore, the description has been given of a case where a zoom operation is not performed. When a zoom operation toward a telephoto position is performed (i.e., when enlargement is performed), a subject existing in a screen peripheral part falls outside an image capturing field angle. Thus, the detection/tracking range 1401 may be restricted to a screen center part as compared with a case where a zoom operation is not performed.

Because the degree at which a subject falls outside image capturing field angle varies depending also on the speed of a zoom operation, the setting of the detection/tracking range 1401 may be changed in accordance with a zoom speed. For example, while the detection/tracking range 1401 is not restricted in a case where a zoom speed is slow, the detection/tracking range 1401 may be restricted to a small range only in a case where a zoom speed is fast.

Furthermore, the weight Wp of a priority of a face with respect to a distance from reference coordinates of a detected face, and the weight Ws of a priority of a face with respect to a detected face size may be set in such a manner as to vary between a case where a zoom operation is performed and a case where a zoom operation is not performed. For example, in face AF control for subject following, as compared with a case where a zoom operation is not performed, the weight Wp of a priority of a face with respect to a distance from reference coordinates may be set in such a manner that the weight Wp becomes larger as a distance has a larger value. In addition, the weight Ws of a priority of a face with respect to a detected face size may be set in such a manner that the weight Ws with respect to a current main face size becomes the largest. In addition, in face AF control for subject change, as compared with a case where a zoom operation is not performed, the weight Wp of a priority of a face with respect to a distance from reference coordinates may be set in such a manner that the weight Wp becomes smaller as a distance has a larger value. In addition, the weight Ws of a priority of a face with respect to a detected face size may be set in such a manner that the weight Ws becomes smaller as the detected face size becomes a larger size.

Referring back to FIG. 2, processing in steps S214 to S216 will be described.

In step S214, the camera control unit 115 determines whether a subject following determination result obtained in step S209 indicates "following". In a case where the subject following determination result indicates "following" (YES in step S214), the processing proceeds to step S215. On the other hand, in a case where it is determined that the subject following determination result indicates "not following" (i.e., the subject following determination result indicates that a subject change (or a field angle change) is to be performed), the processing proceeds to step S216.

In step S215, the camera control unit 115 performs whole area AF control suitable for a PT operation for following the subject that has been detected and is to be tracked. In step S216, the camera control unit 115 performs whole area AF control suitable for a PT operation for changing a subject. The details will be described below with reference to flowcharts illustrated in FIGS. 8 and 9.

Figure 8:
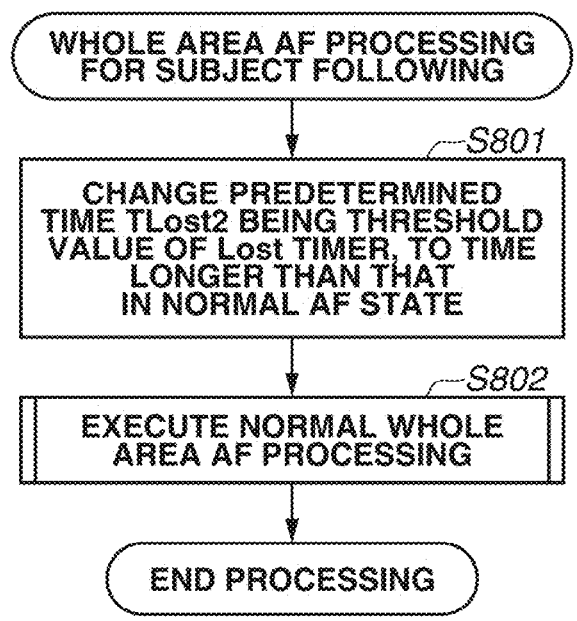
FIG. 8 is a flowchart illustrating whole area AF processing for subject following according to an exemplary embodiment.
Figure 9:
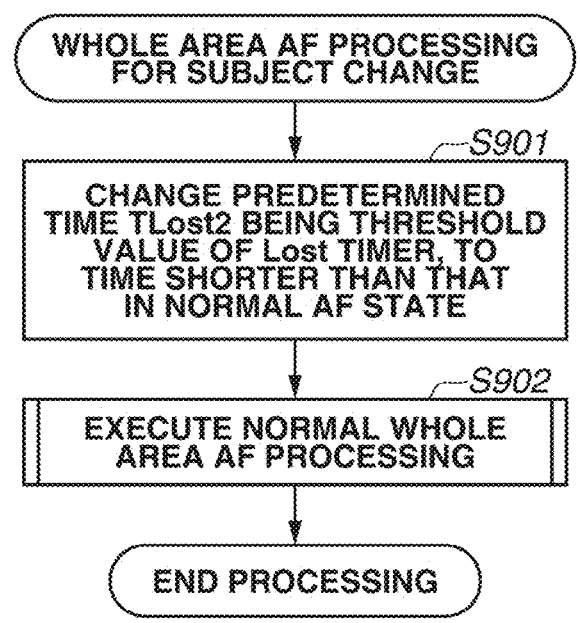
FIG. 9 is a flowchart illustrating whole area AF processing for subject change according to an exemplary embodiment.

FIGS. 8 and 9 are flowcharts illustrating processing of changing the predetermined time TLost2. The following three-pattern threshold values are provided. In the present exemplary embodiment, for example, the predetermined time TLost2 is set as follows.

Normal AF: about 1 second
AF for subject change: about 0.5 seconds
AF for subject following: about 2.0 seconds That is, in a case where it is determined that the user desires to change a subject, by setting a shorter time, a subject is swiftly identified, and in a case where it is determined that the user desires to follow a subject, by setting a longer time, the same subject is maintained as far as possible.

FIG. 8 is a flowchart illustrating whole area AF processing for subject following in step S215.

In step S801, the camera control unit 115 performs processing of changing the predetermined time TLost2 being a threshold value of the Lost timer, to a time longer than that in a "normal AF" state.

In step S802, the camera control unit 115 performs normal whole area AF control illustrated in FIG. 4, and ends the processing.

FIG. 9 is a flowchart illustrating whole area AF processing for subject change in step S216.

In step S901, the camera control unit 115 performs processing of changing the predetermined time TLost2 being a threshold value of the Lost timer, to a time shorter than that in the "normal AF" state.

In step S902, the camera control unit 115 performs normal whole area AF control illustrated in FIG. 4, and ends the processing.

FIGS. 10 and 17A to 17D are a flowchart and diagrams illustrating detection/tracking range change processing.

The control has the following features.

(1) In a case where a subject is not being followed, in accordance with PTZ amounts, offset and reduction of a detection/tracking range serving as a main subject are performed from a detection range A or a tracking range B.
(2) In a case where a subject is being followed, in accordance with PTZ amounts, enlargement of a range serving as a main subject is performed from the detection range A or the tracking range B.
(3) In the case of the feature (1), an offset amount satisfies "an offset amount A set when a face is detected>an offset amount B set when a face is not detected".

The above-described feature (1) is a measure to be taken to help the user to put a focus on a targeted subject. The above-described feature (2) is a measure to be taken to help the user to maintain a targeted subject as far as possible. In the above-described feature (3), in a case where a face is detected, because a possibility that a subject moves to the end of a screen is high, an offset amount is set to a large amount, and in a case where a face is not detected, an offset amount is set to a small amount. This will be described with reference to FIGS. 17A to 17D.

FIG. 17A illustrates a state before panning to be executed when a face is not detected. A tracking range 1701 indicated by a broken line is arranged at the screen center. FIG. 17B illustrates a state during panning executed when a face is not detected. A panning amount 1703 schematically represents an amount of panning. The tracking range 1701 indicated by the broken line is offset by panning, and becomes a tracking range 1702 indicated by a solid line. An offset amount 1704 schematically represents an offset amount at the time.

FIG. 17C illustrates a state before panning to be executed when a face is detected. A detection range 1705 indicated by a broken line is arranged at the screen center. FIG. 17D illustrates a state during panning executed when a face is detected. A panning amount 1703 schematically represents an amount of panning. The detection range 1705 indicated by the broken line is offset by panning, and becomes a detection range 1706 indicated by a solid line. An offset amount 1707 schematically represents an offset amount at the time.

If the offset amount 1704 obtained when a face is not detected, and the offset amount 1707 obtained when a face is detected are compared, a relationship of "the offset amount 1707>the offset amount 1704" is satisfied. This is because a possibility that a face existing at the screen end is set as a main subject is higher when a face is detected. Thus, by actively offsetting a range, it becomes possible to detect a new subject existing in the panning direction, as a main subject.

On the other hand, in a case where a face is not detected, a possibility that an object positioned at the screen end is set as a main subject is low.

Thus, by setting an offset amount with respect to panning to a small offset amount, consideration is given in such a manner that a subject existing as close as possible to the center, and existing in the panning direction can be detected.

Figure 10:
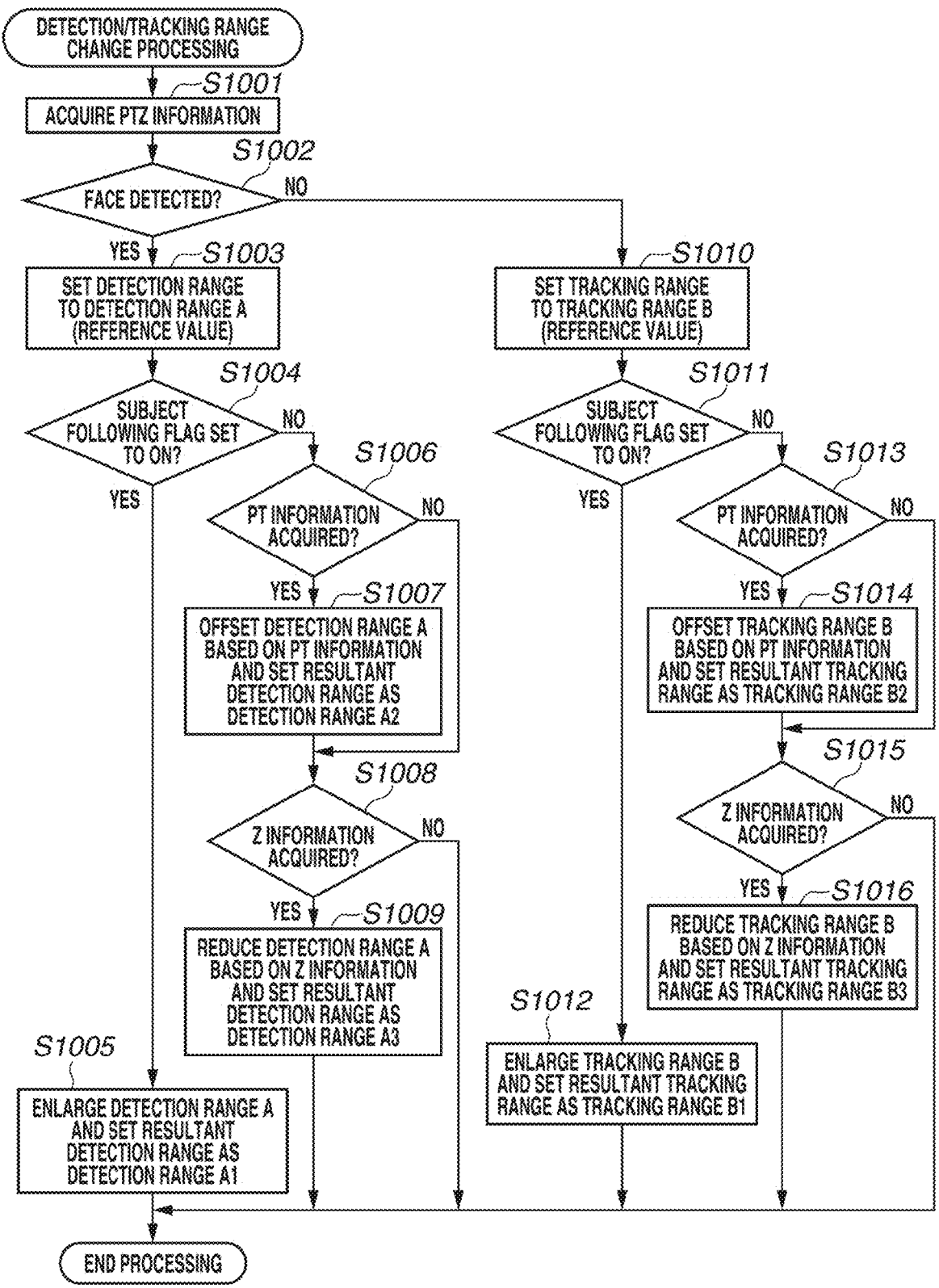
FIG. 10 is a flowchart illustrating detection/tracking range change processing.

FIG. 10 is a flowchart illustrating detection/tracking range change processing.

In step S1001, the camera control unit 115 performs processing of acquiring information regarding a panning (Pan) operation and a tilting (Tilt) operation from the operation unit 302 of the controller 300 operated by the user.

In step S1002, the camera control unit 115 performs processing of determining whether a face has been detected. In a case where a face has been detected (YES in step S1002), the processing proceeds to step S1003. In a case where a face has not been detected (NO in step S1002), the processing proceeds to step S1010.

In step S1003, the camera control unit 115 performs processing of setting a detection range to the detection range A (reference value). The detection range A (reference value) has a size of about 60% of a screen.

Figure 5:
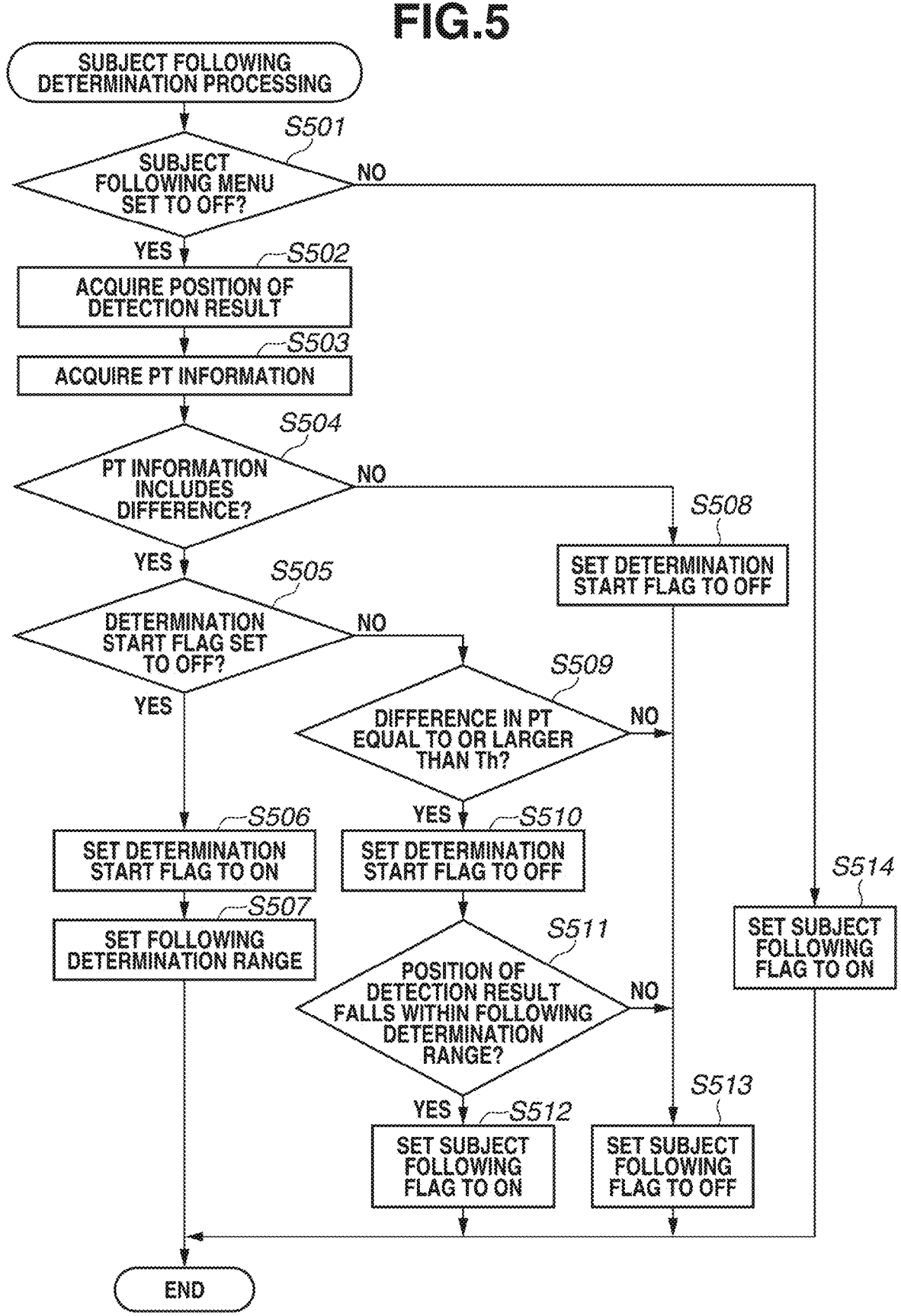
FIG. 5 is a flowchart illustrating subject following determination processing.

In step S1004, the camera control unit 115 determines whether "the subject following flag" set in FIG. 5 is set to ON. In a case where the subject following flag is set to ON (YES in step S1004), the camera control unit 115 determines that a subject is being followed, and the processing proceeds to step S1005. In a case where the subject following flag is not set to ON (NO in step S1004), the processing proceeds to step S1006.

In step S1005, the camera control unit 115 performs processing of enlarging the detection range A and setting the resultant detection range as a detection range A1, and ends the processing. An enlargement ratio is set to 20%, and may vary in accordance with PT amounts.

In step S1006, the camera control unit 115 determines whether PT information has been acquired. In a case where PT information has been acquired (YES in step S1006), the processing proceeds to step S1007. In a case where PT information has not been acquired (NO in step S1006), the processing proceeds to step S1008.

In step S1007, the camera control unit 115 performs processing of offsetting the detection range A based on the PT information. An offset amount changes in accordance with the PT information. The camera control unit 115 sets the offset detection range as a detection range A2.

In step S1008, the camera control unit 115 determines whether Z information has been acquired. In a case where Z information has been acquired (YES in step S1008), the processing proceeds to step S1009. In a case where Z information has not been acquired (NO in step S1008), the camera control unit 115 ends the processing.

In step S1009, the camera control unit 115 performs processing of reducing the detection range A based on the Z information. A reduction ratio changes based on the Z information. The camera control unit 115 sets the reduced detection range as a detection range A3.

In step S1010, the camera control unit 115 performs processing of setting a tracking range to the tracking range B (reference value). The tracking range B (reference value) has a size of about 60% of the screen.

In step S1011, the camera control unit 115 determines whether "the subject following flag" set in FIG. 5 is set to ON. In a case where the subject following flag is set to ON (YES in step S1011), the camera control unit 115 determines that a subject is being followed, and the processing proceeds to step S1012. In a case where the subject following flag is not set to ON (NO in step S1011), the processing proceeds to step S1013.

In step S1012, the camera control unit 115 performs processing of enlarging the tracking range B and setting the resultant detection range as a tracking range B1, and ends the processing. An enlargement ratio is set to 10%, and may vary in accordance with PT amounts.

In step S1013, the camera control unit 115 determines whether PT information has been acquired. In a case where PT information has been acquired (YES in step S1013), the processing proceeds to step S1014. In a case where PT information has not been acquired (NO in step S1013), the processing proceeds to step S1015.

In step S1014, the camera control unit 115 performs processing of offsetting the tracking range B based on the PT information. An offset amount changes in accordance with the PT information. The camera control unit 115 sets the offset tracking range as a tracking range B2.

In step S1015, the camera control unit 115 determines whether Z information has been acquired. In a case where Z information has been acquired (YES in step S1015), the processing proceeds to step S1016. In a case where Z information has not been acquired (NO in step S1015), the camera control unit 115 ends the processing.

In step S1016, the camera control unit 115 performs processing of reducing the tracking range B based on the Z information, and ends the processing. A reduction ratio changes based on the Z information. The camera control unit 115 sets the reduced tracking range as a tracking range B3.

FIGS. 16A to 16L are schematic diagrams illustrating an effect to be obtained when a face is not detected.

FIGS. 16A to 16D are diagrams illustrating an effect to be obtained when a subject is changed.

FIG. 16A is a diagram illustrating a state before panning. FIG. 16A illustrates a camera work of panning from a subject 1601 toward a subject 1602. The tracking range B (1603) is positioned at the screen center.

FIG. 16B is a diagram illustrating a state during panning. FIG. 16B illustrates a state after panning at an angle equal to or larger than a threshold value has been detected in FIG. 5, it has been determined in following determination that "the subject following flag is set to OFF", and a camera has determined that "the user desires to change a subject". Because "the subject following flag is set to OFF", the tracking range B (1603) is offset in accordance with a panning amount, and becomes the tracking range B2 (1604).

FIG. 16C is a diagram illustrating a state during panning. Because the subject 1601 falls outside the tracking range B2 (1604), the camera identifies the subject 1602 existing near the center of the tracking range B2 (1604), as a main subject. That is, a focus moves from the subject 1601 to the subject 1602. Nevertheless, if the tracking range remains unchanged from the tracking range B (1603), because the subject 1601 is positioned within the tracking range B (1603), a focus is put on the subject 1601.

FIG. 16D illustrates a state after panning. Because panning has ended, the tracking range B (1605) is positioned again at the screen center.

That is, according to the present exemplary embodiment, such an effect that it becomes possible to switch a subject more quickly than the prior art by performing offset in accordance with a panning amount has been obtained.

FIGS. 16E to 16H are diagrams illustrating an effect to be obtained when a subject is followed.

FIG. 16E is a diagram illustrating a state before panning. FIG. 16E illustrates a camera work of panning while maintaining a subject 1606. The tracking range B (1607) is positioned at the screen center.

FIG. 16F is a diagram illustrating a state during panning. FIG. 16F illustrates a state after panning at an angle equal to or larger than a threshold value has been detected in FIG. 5, it has been determined in following determination that "the subject following flag is set to ON", and a camera has determined that "the user desires to follow a subject". Because "the subject following flag is set to ON", the tracking range B (1607) is enlarged and becomes the tracking range B1 (1608).

FIG. 16G is a diagram illustrating a state during panning. Because the subject 1606 is positioned within the tracking range B1 (1608), a state in which a focus is put on the subject 1606 is maintained. Nevertheless, if the tracking range remains unchanged from the tracking range B (1607), because a large proportion of the subject 1606 falls outside the range, a focus might deviate from the subject 1606.

FIG. 16H illustrates a state after panning. Because panning has ended, the tracking range B (1609) is positioned again at the screen center.

That is, according to the present exemplary embodiment, such an effect that a focus is continuously put on a subject for a time longer than the prior art by enlarging a tracking range has been obtained.

FIGS. 16I to 16L are diagrams illustrating an effect to be obtained when a subject is changed in a case where pan, tilt, and zoom operations have been performed.

Figures 16I, 16J, 16K, 16L:
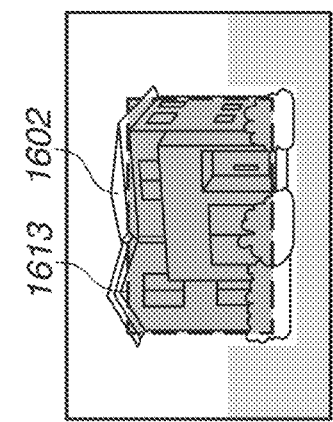

FIG. 16I is a diagram illustrating a state before panning. FIG. 16I illustrates a camera work of performing pan, tilt, and zoom from the subject 1601 to the subject 1602. The tracking range B (1610) is positioned at the screen center.

FIG. 16J is a diagram illustrating a state during panning. FIG. 16J illustrates a state after pan or tilt at an angle equal to or larger than a threshold value has been detected in FIG. 5, it has been determined in following determination that "the subject following flag is set to OFF", and a camera has determined that "the user desires to change a subject". Because "the subject following flag is set to OFF", offset/reduction of the tracking range B (1610) is performed in accordance with a pan/tilt/zoom amount and the tracking range B (1610) becomes the tracking range B3 (1611). During zoom, because it is highly likely that a main subject is positioned at the screen center, in a case where a change in focal length becomes equal to or larger than a threshold value, a subject near the center of a tracking range is identified as a main subject. Furthermore, if a subject is changed when a focal length is in a wide angle state, a depth of field becomes deeper. This reduces a failure in focus movement because a focus movement amount becomes smaller.

Thus, the subject 1602 existing near the center of the tracking range B3 (1611) is identified as a main subject. That is, a focus moves from the subject 1601 to the subject 1602.

Nevertheless, if the tracking range remains unchanged from the tracking range B (1610), because the subject 1601 is positioned within the range, a focus is put on the subject 1601. There is no problem in this state, but as described above, in a case where a subject is changed not on a wide angle side but on a telephoto side, a defocus amount becomes larger and ranging becomes unstable. This might cause a failure in focus movement.

FIG. 16K is a diagram illustrating a state during panning. Because the subject 1601 falls outside the tracking range B3 (1611), a focus does not move again.

FIG. 16L illustrates a state after panning. Because panning has ended, the tracking range B (1613) is positioned again at the screen center.

That is, according to the present exemplary embodiment, offset/reduction of a tracking range is performed in accordance with amounts of pan, tilt, and zoom, and in a case where a zoom amount changes by a threshold value or more, a subject existing at the center of the tracking range is identified as a main subject. Consequently, such an effect that it becomes possible to switch a subject more quickly than the prior art has been obtained.

As described above, in the present exemplary embodiment, by determining whether a PT operation is an operation for following a subject, or an operation for changing a subject, and changing the control of subject detection and tracking in accordance with the determination result, it is possible to identify a subject suitable for the intention of the user as a main subject. With this configuration, with regard to image capturing conditions such as information regarding exposure control, white balance control, and focus control, it becomes possible to provide a system that can perform image capturing while automatically following a subject.

Hereinafter, a second exemplary embodiment of the present disclosure will be described based on the accompanying drawings.

<Configuration of Camera System>

Figure 18:
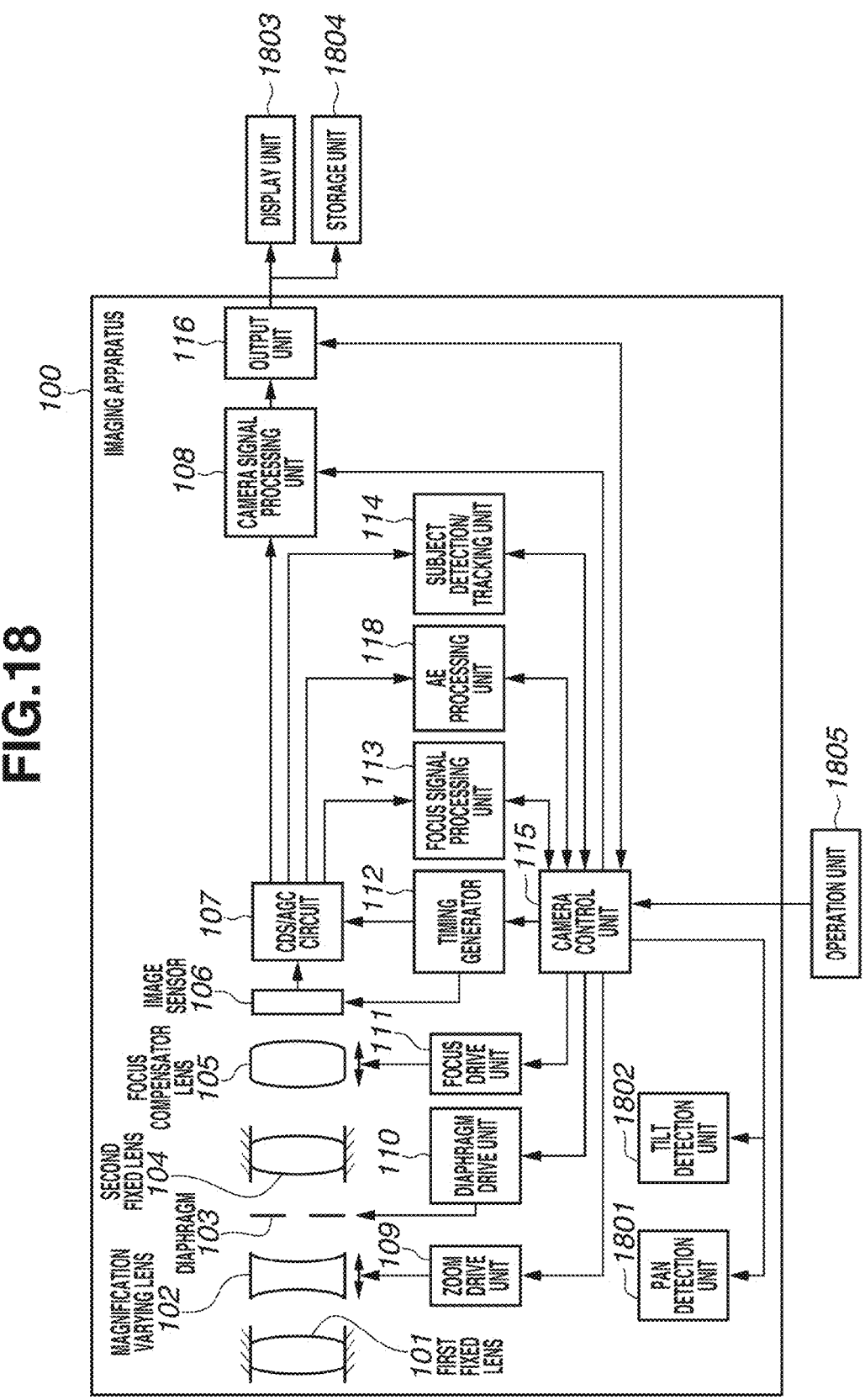
FIG. 18 is a block diagram illustrating a schematic configuration of a camera system according to a second exemplary embodiment of the present disclosure that can detect a panning operation and a tilting operation, and also includes a zoom function.

FIG. 18 is a block diagram illustrating a schematic configuration of a camera system according to the second exemplary embodiment of the present disclosure that can detect a panning operation and a tilting operation, and also includes a zoom function.

As illustrated in FIG. 18, the camera system according to the present exemplary embodiment has a configuration in which a part of components of the camera platform unit 200 and the controller 300 are included in the camera unit 100, among the components of the camera platform camera system according to the first exemplary embodiment. Then, the camera control unit 115 comprehensively controls the operations of the entire camera unit 100. Similarly to the first exemplary embodiment, the camera control unit 115 includes processors such as a CPU and an MPU, and a storage unit such as a memory. Furthermore, the camera control unit 115 includes an arithmetic circuit, and the arithmetic circuit may execute a part of calculation functions to be executed by a processor.

<Configuration of Camera Unit 100>

A configuration different from the first exemplary embodiment will be described. Because the components in FIG. 18 that have the same reference numerals as those in FIG. 1 are the same as those in the first exemplary embodiment, the description will be omitted. An operation unit 1805 includes members (not illustrated) such as a dial for a focus operation, a lever for a zoom operation, and a button and a switch for mode switching. In the present exemplary embodiment, the description will be given assuming that the operation unit 1805 is included in the camera unit 100, but the operation unit 1805 may be connected separately from the camera unit 100, like an infrared remote controller or a wired remote controller. In a case where an operation such as focus or zoom is performed, in accordance with a control command and control information that have been received from the operation unit 1805, the camera control unit 115 controls the diaphragm drive unit 110, the zoom drive unit 109, or the focus drive unit 111.

A display unit 1803 is a display device such as an LCD or an organic EL display. The display unit 1803 displays image data output by the output unit 116 of the camera unit 100. In the present exemplary embodiment, the description will be given assuming that the display unit 1803 is included in the camera unit 100, but the display unit 1803 may be connected separately from the camera unit 100, like a television monitor or a tablet terminal. The operation unit 1805 is not limited to a physical operation member. Application software for control may be displayed on the display unit 1803, and buttons and switches arranged on a screen may be made operable by a touch operation.

A storage unit 1804 includes a storage medium such as an optical disk, a semiconductor memory, or a magnetic tape, and records image data output via the output unit 116. In the present exemplary embodiment, the description will be given assuming that the storage unit 1804 is also included in the camera unit 100, but the storage unit 1804 may be an external hard disk drive or a memory connected via a universal serial bus (USB) cable.

A pan detection unit 1801 and a tilt detection unit 1802 respectively detect a pan operation and a tilt operation of a camera based on an output from a gyro sensor (not illustrated) included in the camera unit 100, and vector information detected from image data of the camera signal processing unit 108. The camera control unit 115 determines whether a subject is being followed, based on detection results received from the pan detection unit 1801 and the tilt detection unit 1802, and a subject detection/tracking result.

<AF Frame Automatic Following Processing According to Second Exemplary Embodiment>

Next, AF frame automatic following processing in the camera system, which is a characteristic of the present exemplary embodiment, will be described. A flow of basic processing is similar to the flow according to the first exemplary embodiment that is illustrated in FIG. 2. More specifically, it is determined whether a main subject is being followed, based on a detection/tracking result and PT operation information, a main subject is selected in accordance with a determination result, an AF frame is caused to follow the main subject, and focusing control is performed.

Nevertheless, differences lie in PTZ information acquisition processing in step S202 and a method of determining whether a PT operation has been performed that is used in step S205.

In the PTZ information acquisition processing in step S202, in the first exemplary embodiment, change amounts and speeds of image capturing in a pan direction and a tilt direction (may be angle change amount per unit time) are acquired from operation information transmitted from the controller 300. Alternatively, drive states of the pan drive unit 201 and the tilt drive unit 202 of the camera platform unit 200 are acquired. On the other hand, the present exemplary embodiment differs in that detection results of the pan detection unit 1801 and the tilt detection unit 1802 are acquired.

The present exemplary embodiment also differs in that, in step S205, it is determined whether a PT operation has been performed, in accordance with detection results of the pan detection unit 1801 and the tilt detection unit 1802. Because the remaining processing is similar to that in the first exemplary embodiment, the description will be omitted.

Figure 19:
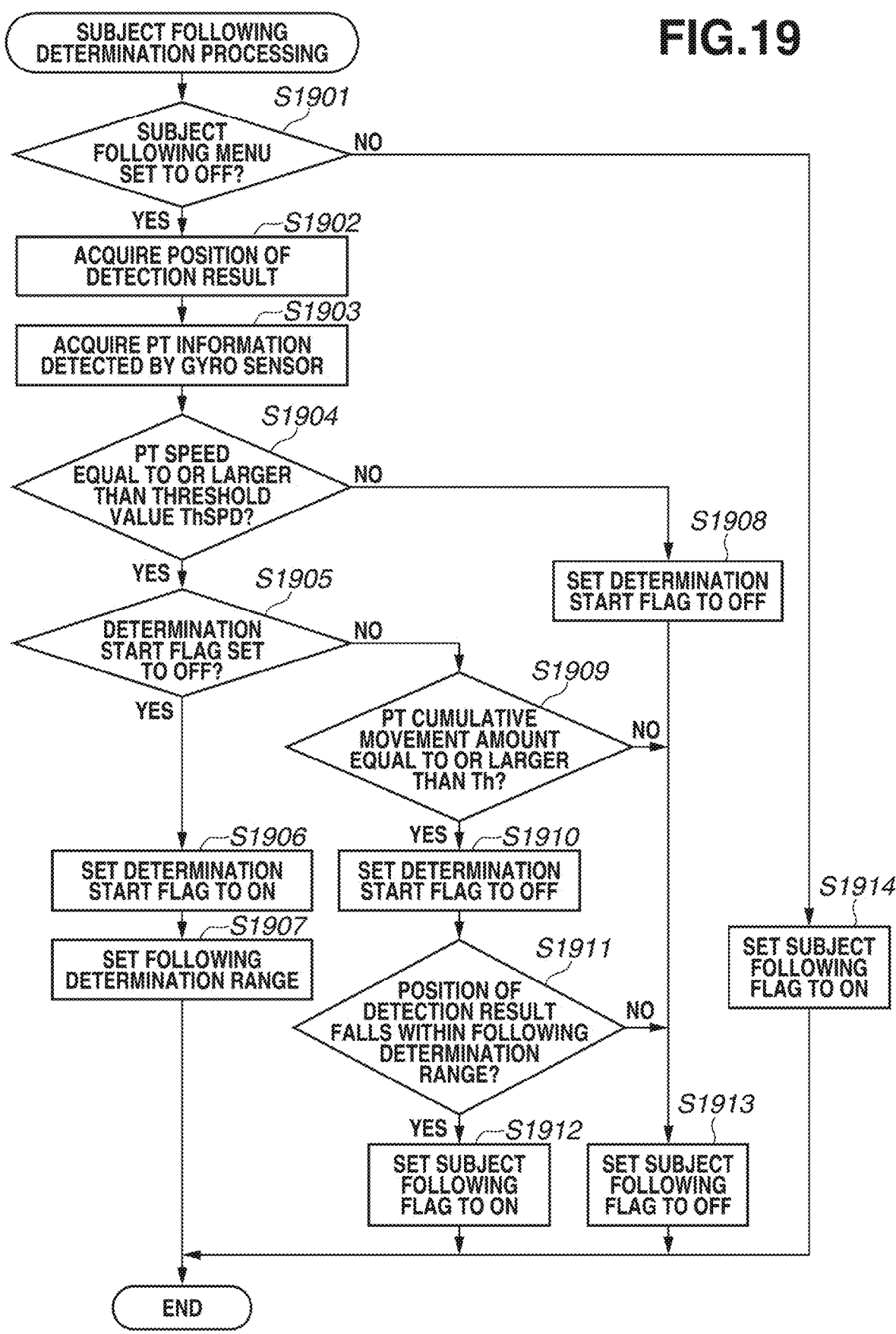
FIG. 19 is a flowchart illustrating subject following determination processing.

FIG. 19 illustrates subject following determination processing.

A flow of basic processing is similar to the flow according to the first exemplary embodiment that is illustrated in FIGS. 5 and 15A to 15F, and the processing is processing of determining whether a subject is a subject desired to be followed when a PT operation has been performed, based on PT operation information and a detection/tracking result.

The present exemplary embodiment differs in that detection results of the pan detection unit 1801 and the tilt detection unit 1802 are acquired, and PT movement amounts are calculated based on the detection results.

A flowchart illustrating a flow of subject following determination processing will be described with reference to FIG. 19.

Because processing in steps S1901 to S1902 is the same processing as the processing in steps S501 to S502, the description will be omitted.

In step S1903, the camera control unit 115 performs processing of calculating information regarding panning and tilting, based on angular speed information detected from a gyro sensor (not illustrated).

Angular speed information in a Yaw direction and a Pitch direction that can be acquired from the gyro sensor is acquired, and a pan tilt speed obtained by converting an angular speed into a speed on an imaging plane is denoted by Spd [um/s]. In a case where the determination start flag is set to ON, a movement amount on the imaging plane is calculated.

As a calculation method, a movement amount L [um] on the imaging plane is calculated using the following formula.

Pan tilt speed $Spd$ [um/s]×Image capturing cycle $Fr$ [s]=Movement amount $L$ [um] on imaging plane The movement amount L [um] in the Yaw direction and the Pitch direction is calculated for each image capturing cycle, and a cumulative movement amount Lsum [um] on the imaging plane is obtained that indicates an amount of cumulative movements while the determination start flag is set to ON.

The cumulative movement amount Lsum on the imaging plane in the Yaw and Pitch directions is regarded as a movement amount of panning/tilting.

In step S1904, the camera control unit 115 determines whether the pan tilt speed Spd [um/s] acquired in step S1903 is equal to or larger than a threshold value ThSPD. In a case where the pan tilt speed Spd [um/s] is equal to or larger than the threshold value ThSPD (YES in step S1904), the camera control unit 115 determines that a PT operation has been performed, and the processing proceeds to step S1905. In a case where the pan tilt speed Spd [um/s] is not equal to or larger than the threshold value ThSPD (NO in step S1904), the processing proceeds to step S1908. Because processing in steps S1905 to S1908 is the same as the processing in steps S505 to S508 of FIG. 5, the description will be omitted.

In step S1909, the camera control unit 115 determines whether a pan tilt movement amount (the cumulative movement amount Lsum on the imaging plane) is equal to or larger than Th. If a pan tilt movement amount is equal to or larger than Th (YES in step S1909), the processing proceeds to step S1910. In a case where a pan tilt movement amount is not equal to or larger than Th (NO in step S1909), the processing proceeds to step S1913.

Because processing in steps S1910 to S1914 is the same as the processing in steps S510 to S514 of FIG. 5, the description will be omitted. Heretofore, the description has been given with reference to FIG. 19.

As described above, according to the present exemplary embodiment, instead of a PTZ camera fixedly installed at a specific point as described in the first exemplary embodiment, a handheld camera such as a single-lens reflex camera or a video camera can identify a subject suitable for the intention of the user as a main subject. With this configuration, with regard to image capturing conditions such as exposure control, white balance control, and focus control, it becomes possible to provide a system that can perform image capturing while automatically following a subject.

OTHER EXEMPLARY EMBODIMENTS

The present disclosure is also implemented by executing the following processing. More specifically, the processing is processing of supplying a software program for implementing the functions of the above-described exemplary embodiments, to a system or an apparatus including a computer that can execute programs, directly from a recording medium or using wired/wireless communication, and executing the software program. Accordingly, a program code to be supplied to the computer and installed thereon to implement functional processing of the present disclosure on the computer also implements the present disclosure. That is, a computer program for implementing functional processing of the present disclosure is also included in the present disclosure. In this case, as long as a function of a program is included, the format of the program is not limited, and the program may be an object code, a program to be executed by an interpreter, or script data to be supplied to an operating system (OS). The recording medium for supplying programs may be a hard disk, a magnetic recording medium such as a magnetic tape, optical/magnetooptical storage medium, or a nonvolatile semiconductor memory, for example.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-190750, filed Nov. 29, 2022, which is hereby incorporated by reference herein in its entirety.

What is claimed is:

1. An imaging apparatus comprising:
an image sensor configured to generate image data by capturing an image of a subject;
at least one processor configured to:
set an image capturing condition;
identify a main subject in the image data that is to be used for a setting of the image capturing condition; and
in a case where a field angle change operation equal to or larger than a predetermined amount has been performed, perform control in such a manner as to change processing for identifying a subject, according to whether the main subject is being followed.

2. The imaging apparatus according to claim 1, wherein the image capturing condition includes information regarding at least any of exposure control, focus control, and white balance control.

3. The imaging apparatus according to claim 1, wherein the field angle change operation is at least any of a pan operation, a tilt operation, and a zoom operation.

4. The imaging apparatus according to claim 1, wherein the change of the processing for identifying the subject is performed by changing a region for detecting a subject that is to be used when a subject in the image data is identified.

5. The imaging apparatus according to claim 4, wherein the processing for identifying the subject is processing of offsetting a region for detecting a subject that is to be used when a subject in the image data is identified, from reference coordinates.

6. The imaging apparatus according to claim 4, wherein the processing for identifying the subject is processing of changing a size of the region for detecting a subject.

7. The imaging apparatus according to claim 6, wherein, in a case where a main subject is not being followed, the region for detecting a subject is reduced from a reference value.

8. The imaging apparatus according to claim 6, wherein, in a case where a determination result obtained from a determination unit indicates a state in which a main subject is being followed, the region for detecting a main subject is enlarged from a reference value.

9. The imaging apparatus according to claim 1, further comprising a determination unit configured to determine whether a state is a state in which a main subject is being followed, in a case where an operation of pan tilt has been detected by a detection unit,
wherein the determination unit performs determination based on a change amount in a pan direction and a tilt direction.

10. The imaging apparatus according to claim 9, further comprising a mode setting unit configured to perform a mode setting as to whether to execute subject following, when an operation of the pan tilt is performed,
wherein the determination unit performs determination in accordance with a setting of the mode setting unit.

11. The imaging apparatus according to claim 5,
wherein a first state in which a main subject identified by the identification unit is followed, and a second state in which a prestored specific subject is detected and followed are included, and
wherein processing of identifying a main subject that is to be executed by the identification unit is changed between the first state and the second state.

12. The imaging apparatus according to claim 11, wherein an amount of the offset in the second state is set in such a manner as to become a larger value than that in the first state.

13. The imaging apparatus according to claim 11, wherein, in the first state, the identification unit identifies a subject near a center of the region for detecting a subject, as a first main subject.

14. The imaging apparatus according to claim 13, wherein, in the first state, in a case where the first main subject becomes nonexistent in the region for detecting a subject, the identification unit identifies a subject near a center of the region for detecting a subject, as a second main subject.

15. The imaging apparatus according to claim 13, wherein, in the first state, in a case where a zoom amount has changed by a predetermined amount or more, the identification unit identifies a subject near a center of the region for detecting a subject, as a third main subject.

16. The imaging apparatus according to claim 11, wherein, in the second state, in a case where a plurality of subjects exists, the identification unit identifies a fourth main subject from among the plurality of subjects based on a parameter for determining a main subject, and in a case where it is determined based on the parameter for determining a main subject, that the fourth main subject is not a main subject, the identification unit identifies a fifth main subject from among the plurality of subjects.

17. The imaging apparatus according to claim 16, wherein, in the second state, in a case where a determination result obtained from a determination unit does not indicate a state in which a subject is being followed, the identification unit changes the parameter for determining a main subject, to a first parameter to cause switching from the fourth main subject to the fifth main subject.

18. The imaging apparatus according to claim 17, wherein, in the second state, in a case where a determination result obtained from the determination unit indicates a state in which a subject is being followed, the identification unit changes the parameter for determining a main subject, to a second parameter to avoid occurrence of switching of the fourth main subject.

19. The imaging apparatus according to claim 18,
wherein the first parameter indicates a region for selecting a main subject being a region for selecting a main subject of the region for detecting a subject, and
wherein the identification unit offsets the region for selecting a main subject, in accordance with a change amount in a pan direction and a tilt direction.

20. The imaging apparatus according to claim 19,
wherein the first parameter and the second parameter indicate a switching standby time until the fourth main subject switches to the fifth main subject in a case where the fourth main subject becomes nonexistent from the region for selecting a main subject, and
wherein the identification unit sets the switching standby time indicated by the first parameter, to a time shorter than the switching standby time indicated by the second parameter.

21. The imaging apparatus according to claim 18,
wherein the second parameter indicates existence or non-existence of switching control of the main subject, and
wherein the identification unit stops occurrence of switching control from the fourth main subject to a different subject.

22. The imaging apparatus according to claim 18,
wherein the second parameter indicates a smallest size at which the specific subject is detectable, and
wherein the identification unit sets the smallest size as a size of the fourth main subject.

23. A control method of an imaging apparatus including an imaging unit configured to generate image data by capturing an image of a subject, the control method comprising:
setting an image capturing condition;
identifying a subject in the image data that is to be used for a setting of the image capturing condition; and
in a case where a field angle change operation equal to or larger than a predetermined amount has been performed, performing control in such a manner as to change processing for identifying a subject, according to whether the main subject is being followed.

24. A non-transitory computer-readable storage medium storing a program for causing a computer to execute a control method of an imaging apparatus including an image sensor configured to generate image data by capturing an image of a subject, the control method comprising:
setting an image capturing condition;
identifying a subject in the image data that is to be used for a setting of the image capturing condition; and
in a case where a field angle change operation equal to or larger than a predetermined amount has been performed, performing control in such a manner as to change processing for identifying a subject, according to whether the main subject is being followed.

* * * * *